United States Patent [19]

Sasanouchi et al.

[11] Patent Number: 5,936,317
[45] Date of Patent: Aug. 10, 1999

[54] POWER SUPPLY DEVICE FOR VEHICLE

[75] Inventors: Nobuyuki Sasanouchi; Masahiro Tokunaga; Motonori Kido; Hideaki Toyama; Akio Matsumaru; Hiroshi Yamagishi, all of Nagoya, Japan

[73] Assignees: Harness System Technologies Research, Ltd., Nagoya; Sumitomo Wiring System, Ltd., Mie; Sumitomo Electric Industries, Ltd., Osaka, all of Japan

[21] Appl. No.: 08/832,974

[22] Filed: Apr. 4, 1997

[30] Foreign Application Priority Data

| Apr. 9, 1996 | [JP] | Japan | 8-086233 |
| Apr. 9, 1996 | [JP] | Japan | 8-086331 |
| Apr. 9, 1996 | [JP] | Japan | 8-086422 |
| Apr. 11, 1996 | [JP] | Japan | 8-089146 |
| Jun. 17, 1996 | [JP] | Japan | 8-155757 |

[51] Int. Cl.$^6$ ............................................. H02H 3/08
[52] U.S. Cl. .................... 307/10.7; 307/10.1; 307/38; 307/30; 307/126; 315/77; 320/134; 320/136
[58] Field of Search ..................... 307/10.1, 9.1, 307/10.6, 10.7, 10.8, 31, 38–40, 125, 126, 127, 130, 131, 140, 141.4; 361/62–66, 70, 93–94, 102, 114, 170, 187; 701/1, 29, 36; 315/77, 82, 83, 84; 174/106 R; 320/134, 136

[56] References Cited

U.S. PATENT DOCUMENTS

| 3,944,891 | 3/1976 | McDonald et al. ................. 307/127 |
| 4,270,057 | 5/1981 | Holt ....................................... 307/10.7 |
| 4,473,757 | 9/1984 | Farago et al. ......................... 307/127 |
| 4,799,126 | 1/1989 | Kruse et al. ............................ 361/93 |
| 4,807,135 | 2/1989 | Tamai ..................................... 701/36 |
| 4,866,345 | 9/1989 | Kataoka ................................ 307/10.8 |
| 5,304,896 | 4/1994 | Asada et al. ............................ 315/84 |
| 5,321,309 | 6/1994 | Kolomyski ........................... 307/10.8 |
| 5,357,169 | 10/1994 | Toyozumi et al. .................... 307/10.8 |
| 5,388,022 | 2/1995 | Ahuja .................................... 361/94 |
| 5,406,171 | 4/1995 | Moody .................................. 307/10.8 |
| 5,608,271 | 3/1997 | Saka et al. ............................ 307/10.1 |
| 5,625,168 | 4/1997 | Van Siclen, Jr. .................... 174/106 R |

FOREIGN PATENT DOCUMENTS

| 60-15754 | 8/1985 | Japan . |
| 62-161543 | 10/1987 | Japan . |

Primary Examiner—Albert W. Paladini
Attorney, Agent, or Firm—Oliff & Berridge PLC

[57] ABSTRACT

A power supply unit is provided between a car-carried battery and load units, such as a light control unit. The power supply unit is connected to the load units through a multi-signal line. The power supply unit calculates a consumption current consumed by the load unit using an operating state of the load unit which is received through the multi-signal line from the load control unit associated with the load unit. The power supply unit compares the calculated consumption current with a supplying current supplied form the battery. If the supplying current is excessively large, the power supply unit interrupts the supply of current from the battery to the load unit. Therefore, the power supply device can detect a phenomenon, for example, a rare short of an extremely short shorting time.

15 Claims, 19 Drawing Sheets

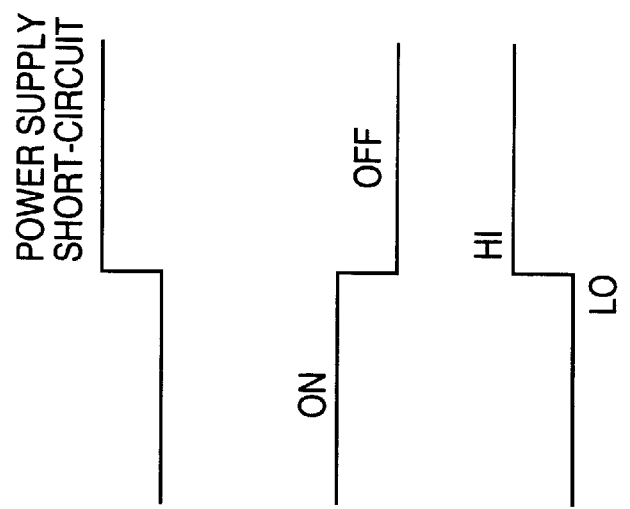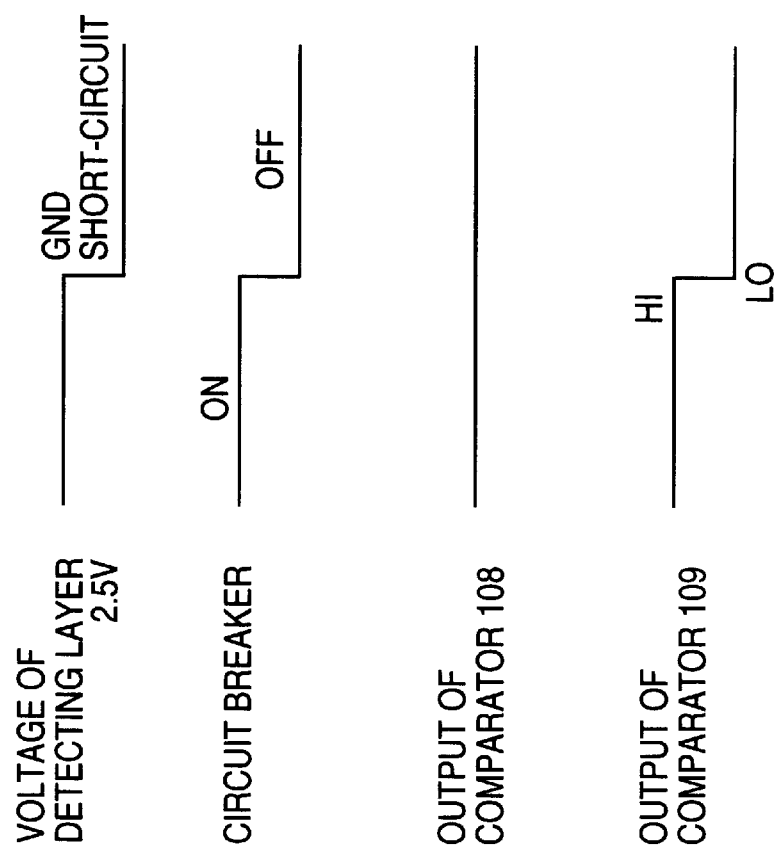

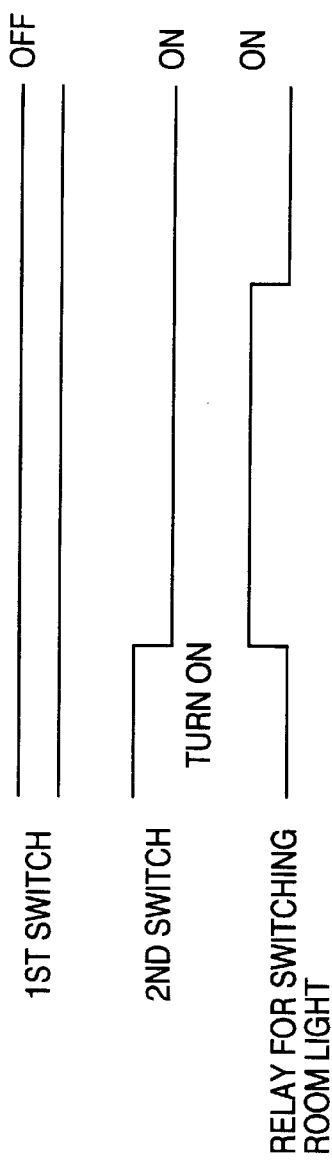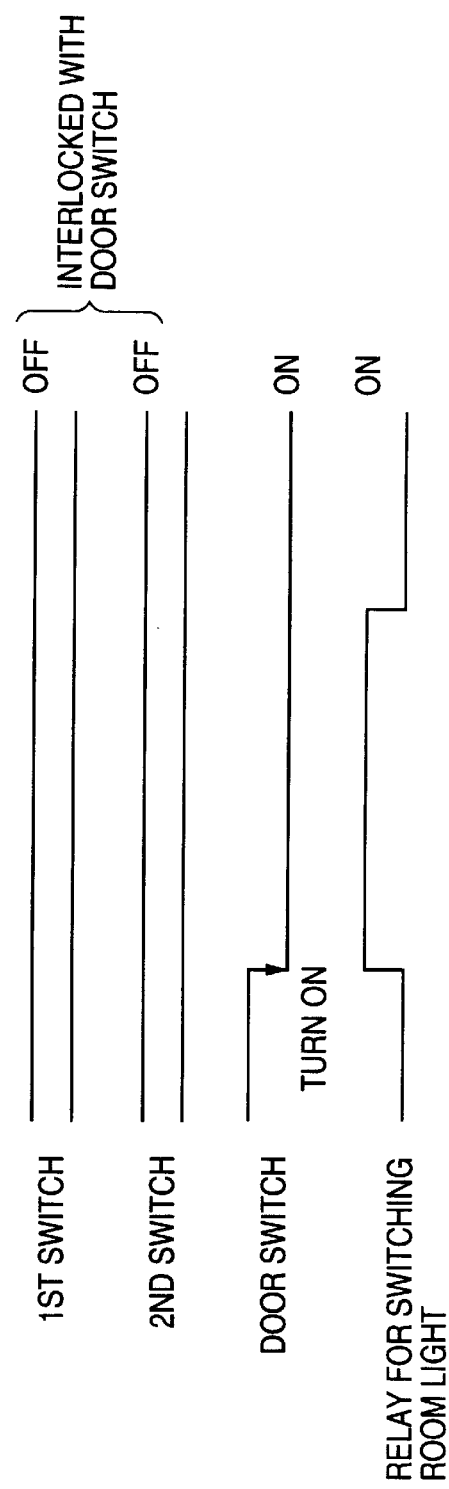
FIG. 15A
FIG. 15B

POWER SUPPLY DEVICE FOR VEHICLE

BACKGROUND OF THE INVENTION

1. Field of the Invention

The present invention relates to a power supply device for a motor vehicle which supplies electric power to electrical components in the motor vehicle. More particularly, the invention relates to a power supply device for a motor vehicle which detects a short and a disconnection of power supplying wires, and interrupts the supply of electric power to loads. Further, the present invention relates to a power supply device for a motor vehicle which supplies large current to auxiliary devices only when the feeding of large current is necessary. Furthermore, the present invention relates to a room lamp device for a motor vehicle for efficiently managing the power consumption by a room lamp in a motor vehicle.

2. Conventional Art

Recent motor vehicles are provided with many electric devices, such as wipers, power windows, door locks, lights, and electronic control units. A number of wires (wire harnesses), which connect a battery to the electric devices, are stretched out on the car body. When the car is running, the stretched out wires are vibrated. In this case, there is a danger that the covering or coverings of one or some wires is broken and the wire covered therewith is disconnected. Particularly, when the covering of the power supplying wire is broken, the exposed wire comes in contact with the car body (at ground potential). A short current flows, so that the covering burns up.

To avoid such a trouble, in a conventional technique, a fusible line 1 and fuses 2, as shown in FIG. 23, are inserted between a battery B and loads such as electrical devices. When a short occurs, a short current melts the fusible line or one of the fuses to shut off the short current.

Each of the fusible elements of the fusible line or the fuses is designed to have a heat capacity, which is selected such that a preset time elapses till temperature of the fusible element reaches a fusible temperature. With such a heat capacity, there is no case that the load is erroneously operated by a rush current or a spike current of the load.

In a rare short in which the exposed part of the wire comes in contact with the car body many times for a short time period, there is a possibility that the covering of the fuses burns up while the fusible line or the fuses are not molten.

In a vehicle, electric devices A1, A2, . . . (generally denoted as A), as shown in FIG. 20, are connected to a car-carried battery B for receiving electric power by which the electric devices are driven. If the battery B is connected to the electric devices A in the reversed polarities, the electric devices will be destroyed. To avoid this, a reverse-connection preventing circuit X is provided in each electric devices, as shown. The reverse-connection preventing circuit X contains a diode D, as shown in FIG. 21.

Unexamined Japanese Utility Model Publication 62-161543 discloses a technique in which a reverse-connection preventing circuit X is provided in the prestage of electric devices A as shown in FIG. 22. The reverse-connection preventing circuit X includes a relay R and a diode D. When an ignition interlocking switch S is turned on, a relay coil Rb is excited to close a relay contact Ra, so that a battery B is connected to electric devices A. When the battery B is connected in the reverse polarities, if the ignition interlocking switch S is turned on, current to the relay coil Rb is blocked by the diode D. The relay contact Ra remains opened. Therefore, the reverse voltage (current of the reverse polarity) is not applied (fed) from the battery B to the electric devices A.

In the battery connection circuit of FIG. 20, the reverse-connection preventing circuit X is provided in each electric devices A. In this respect, the battery connection circuit increases the cost to manufacture. In recent vehicles carrying an increased number of electric devices, the cost-increase problem is serious. In the battery connection circuit of FIG. 22, a single reverse-connection preventing circuit X is provided in the prestage of the electric devices A. Therefore, the FIG. 22 circuit is cheaper than the FIG. 20 circuit.

The battery connection circuits using the reverse-connection preventing circuit or circuits X function to only prevent the reverse voltage from being applied to each electric devices A. Therefore, if the polarities of the battery connected are reversed, it is necessary to disconnect the incorrectly connected battery B and to connect again the battery B in correct polarities.

As shown in FIG. 16, a room lamp 501 as an illumination device is installed in a motor vehicle. It is a common practice that the room lamp device 501 is mounted, together with the lamp switch 502, on the ceiling of the inside of the vehicle.

The room lamp device 501 contains a series circuit consisting of the lamp switch 502 and a room lamp 503, as shown in FIG. 17. One end of the series circuit is connected through a battery connection terminal BT to a battery B, while the other end thereof is connected through a door switch connection terminal DT to a door switch circuit 504. The door switch circuit 504 is earthed.

The lamp switch 502 includes three fixed contacts 505a to 505c and a movable terminal 506 that may be brought into contact with any of these contacts 505a to 505c. With the construction, the lamp switch 502 may put the room lamp device 501 in any of three lighting modes. The first contact 505a is connected to the door switch circuit 504. The door switch circuit 504 includes a parallel circuit consisting of door switches 504a to 504c respectively connected to the doors. These door switches 504a to 504c are interlocked with the doors. When one door is opened, the door switch interlocked with the opened door is turned on. Therefore, in a state that the lamp switch 502 is set at the position of the contact 505a, when one door is opened, the room lamp 503 is lit up.

The second contact 505b of the lamp switch 502 is connected to nothing. Accordingly, when the lamp switch 502 is set at the position of the second contact 505b, the room lamp 503 never lights up irrespective of the opening and closing of the doors. The third contact 505c is earthed. Accordingly, when the lamp switch 502 is set at the position of the third contact 505c, the room lamp 503 remains lit up irrespective of the opening and closing of the doors.

Another room lamp device is known which allows the light-up state of the room lamp 503 to last for a preset time after the door is closed.

A room illumination device for a motor vehicle, electrically expressed as shown in FIG. 18, is disclosed in Unexamined Japanese Utility Model Publication 60-15754.

The illumination device disclosed is generally made up of a charging circuit 510, a soft off circuit 511 and a timer circuit 512. The charging circuit 510 includes a transistor constant current circuit 513 and a door switch circuit 504. The door switch circuit 504 is connected to the constant current circuit 513. The constant current circuit 513 operates when the door switch circuit 504 is rendered on, and supplies a constant current to the soft off circuit 511 and the timer circuit 512.

The soft off circuit 511 includes a comparator circuit 514, a triangle wave generator 515, and a discharging circuit 516. As shown in FIG. 18, the triangle wave generator 515 is connected to the positive input terminal of the comparator circuit 514, and the discharging circuit 516 is connected to the negative input terminal thereof. The discharging circuit 516 includes a parallel circuit consisting of a capacitor and a resistor, and is connected to the charging circuit 510. With such a connection, the comparator circuit 514 receives a difference of the signals output from the discharging circuit 516 and the triangle wave generator 515. The output of the comparator circuit 514 is connected to a transistor switch circuit that is inserted between the first contact 505a of the lamp switch 502 and ground.

The timer circuit 512 includes a transistor timer based on a CR time constant circuit. The transistor of the timer circuit 512 is connected between the soft off circuit 511 and ground. The soft off circuit 511 may be started and stopped by turning on and off the transistor of the timer circuit 512.

In the room illumination device thus arranged, when a door is opened, the charging circuit 510 is put in an on state (I of FIG. 19). Then, the time constant capacitor of the timer circuit is charged. In turn, the timer circuit 512 is put in an on state, and the discharging circuit 516 of the soft off circuit 511 is charged. Further, the triangle wave generator 515 is operated. The output signal is input to the comparator circuit as shown in FIG. 19. Consequently, the comparator circuit 514 produces a light-up signal which in turn lights up the room lamp 503 (FIG. 19).

When the door is closed, the charging circuit 510 is put in an off state (II of FIG. 19), and the discharging circuit 516 starts its discharging operation (FIG. 19). The output signals of the discharging circuit 516 and the triangle wave generator 515 are applied to the comparator circuit 514, which in turn produces a pulse signal consisting of a series of pulses ranging for a time t1. The pulse width of those pulses becomes shorter as shown in FIG. 19. The illumination intensity of the lamp 503 gradually decreases with time. The timer circuit 512 is turned off at the termination of time t2, the soft off circuit 511 is turned off, and finally the room lamp 503 is lit off.

A driver, for example, often leaves the lamp switch on or the door incompletely closed. In this case, the car battery will be dead.

In the lamp device of FIG. 17 and the lamp device with the room lamp device 501 shown in FIG. 18, when the lamp switch 502 is set to the position of the third contact 505c, the room lamp 503 is left connected to the battery B. If a driver leaves the car in a state that the lamp switch 502 is set to that position and the engine is not started up, the battery will be excessively discharged.

Since the lamp switch 502 is interlocked with the door switch circuit 504, the same problem arises when the first contact 505a is closed (usually, the lamp device is used in this state). If a driver leaves his car in a state that the engine is not started up and the door is incompletely closed, the room lamp device 501 is left connected to the battery as in the above case. Accordingly, the battery will be excessively discharged.

The battery capacity of the car is usually 24 to 36 AH [ampere-hours] which is able to start up the engine. For the power consumption of the room lamp, if 12 V and 10 W (=5 W×two lamps), current is nearly equal to 0.8 A. Usually, the battery is put in an excessive discharging state for 30 hours (=24 AH/0.8 A), but the battery loses its ability to start up the engine before 30 h is reached.

SUMMARY OF THE INVENTION

A first object of the present invention is to provide a power supply device for a motor vehicle which can detect a rare short and a short as well, to thereby prevent the covering of a power supplying wire from burning up, and detect a disconnection of the wire.

A second object of the present invention is to provide a battery connection circuit for a vehicle which enables one to connect a battery to electric devices without regard to the reverse polarities of the battery.

A third object of the invention is to provide a lamp device for a motor vehicle which can prevent the battery from being excessively discharged even when a driver inadvertently fails to turn off the lamp switch or leaves the door incompletely closed.

To achieve the above first object, there is provided a power supply device for a motor vehicle characterized in that a power supplying wire is covered with a detecting layer made of metal, with an insulating layer being inserted between them, the detecting layer is maintained at a fixed voltage by means of external resistors, and whether or not a short occurs in a battery-to-load circuit is detected on the basis of a voltage variation of the detecting layer. If the current flowing from the battery to the load is shut off upon detection of the short occurrence, it is possible to prevent the detecting layer from burning up.

In the power supply device, the detecting layer may be maintained at a fixed voltage by resistor means connected to the ends of the detecting layer that are closer to the power supply side and the load side. The power supply device, if so arranged, can detect a disconnection of the detecting layer.

In the power supply device, a shielding layer may be provided between the power supplying wire and the detecting layer. With provision of the shielding layer, the detecting layer is protected against an adverse effect by a voltage variation in the power supplying wire.

Further, to achieve the above first object, there is provided a power supply device for a motor vehicle characterized in that a circuit breaker is inserted between a battery and auxiliary devices, and a resistor is connected across said circuit breaker.

With such an arrangement, if the circuit breaker is turned off, current flows through the resistor. Therefore, if a short occurs in the battery-to-auxiliary devices, a large current never flows through the electric power supplying wire. By turning on the circuit breaker, large current may be fed to the auxiliary devices when it is necessary.

In the power supply device, it is preferable that states of switches associated with said auxiliary devices are detected by monitoring a voltage at a point downstream of said circuit breaker, and said circuit breaker is turned on and off on the basis of a detected state of each said switch.

In the power supply device, the voltage at a point downstream of said circuit breaker is monitored while periodically turning off said circuit breaker within such a time period as not to influence the operation of each said auxiliary device.

Furthermore, to achieve the above first object, there is provided a power supply device for a motor vehicle which constantly monitors operating states of load units connected to a car-carried battery, such as a wiper unit, a power window unit, a door lock unit, and a light unit; calculates currents to be consumed by the load units on the basis of the operating states monitored; compares the calculated consumption current of the load units with a current supplied from the battery; and when the supplied current, which is excessively larger or smaller than the calculated consumption current, is detected, interrupts the supply of electric power from the battery to the associated load unit.

The power supply device may comprise a power supply unit connected to the load units by a multi-signal line, wherein the power supply unit calculates the consumption currents using operating state output from the load units through the multi-signal line.

In the power supply device, the comparison of the calculated consumption current of each the load unit with a current supplied from the battery is performed after a preset time elapses from detection of an operating state of each the load unit. With this, there is eliminated a measurement error owing to a rush current.

The power supply device further may comprise a memory for storing the consumption current values of the load units, wherein the sum of a preset margin and the detected value of the current flowing into the load units is stored into the memory, and each of those sum current values is read out of the memory and compared with the current supplied from the battery.

To achieve the above second object, there is provided a battery connection circuit for a vehicle which enables one to connect a battery to various electric devices without regard to the reverse polarities of the battery. Therefore, current of the correct polarity may be fed to the electric devices irrespective of whether the polarities of the battery are correct or not. A bridge circuit may be used to realize the means to feed the current of the correct polarity to the electric devices.

The battery connection circuit thus arranged can feed current of the correct polarity to the electric devices irrespective of whether the polarities of the battery connected are correct or not. Therefore, such a problem of the conventional battery connection circuit that the electric devices will be destroyed when the battery is connected in the reverse polarities is successfully solved.

To achieve the above third object, there is provided a room lamp device for a motor vehicle in which a room lamp may be placed to any of three modes, a light-on mode, a light-off mode and a temporarily light-on mode in which the room lamp is lit on and off with the opening and closing of the door, by means of a lamp switch inserted between a door switch being turned on and off with the opening and closing of the door and a battery, the room lamp device comprises a controller which lights off the room lamp when the lamp switch is set at a position of the light-on mode for a preset time. With such an arrangement, when the lamp switch is set at a position of the light-on mode for a preset time, the controller judges that the lamp switch is left turned off, and lights off the room lamp.

In the room lamp device, the controller lights off the room lamp when the door switch is set at a position where the room lamp is lit on for a preset time period. With this, when the door switch is turned on for a preset time, the controller judges that the door is incompletely opened, and lights off the room lamp.

The preset time is properly selected, by experience, to be a time long enough to indicate the fact that the driver inadvertently fails to turn off the lamp switch or close the door.

BRIEF DESCRIPTION OF THE PREFERRED EMBODIMENT

FIG. 3A is a waveform diagram showing voltage variations at key portions in the paper termination detecting device when a ground short occurs;

FIG. 3B is a waveform diagram showing voltage variations at key portions in the paper termination detecting device when a power source short occurs;

FIG. 6 shows a set of waveforms at key portions in the power supply device immediately after a switch of an auxiliary device is turned on;

FIGS. 15A and 15B show a set of waveforms for explaining the operation of the room lamp device;

DETAILED DESCRIPTION PREFERRED EMBODIMENTS

First Embodiment

Figure 1:
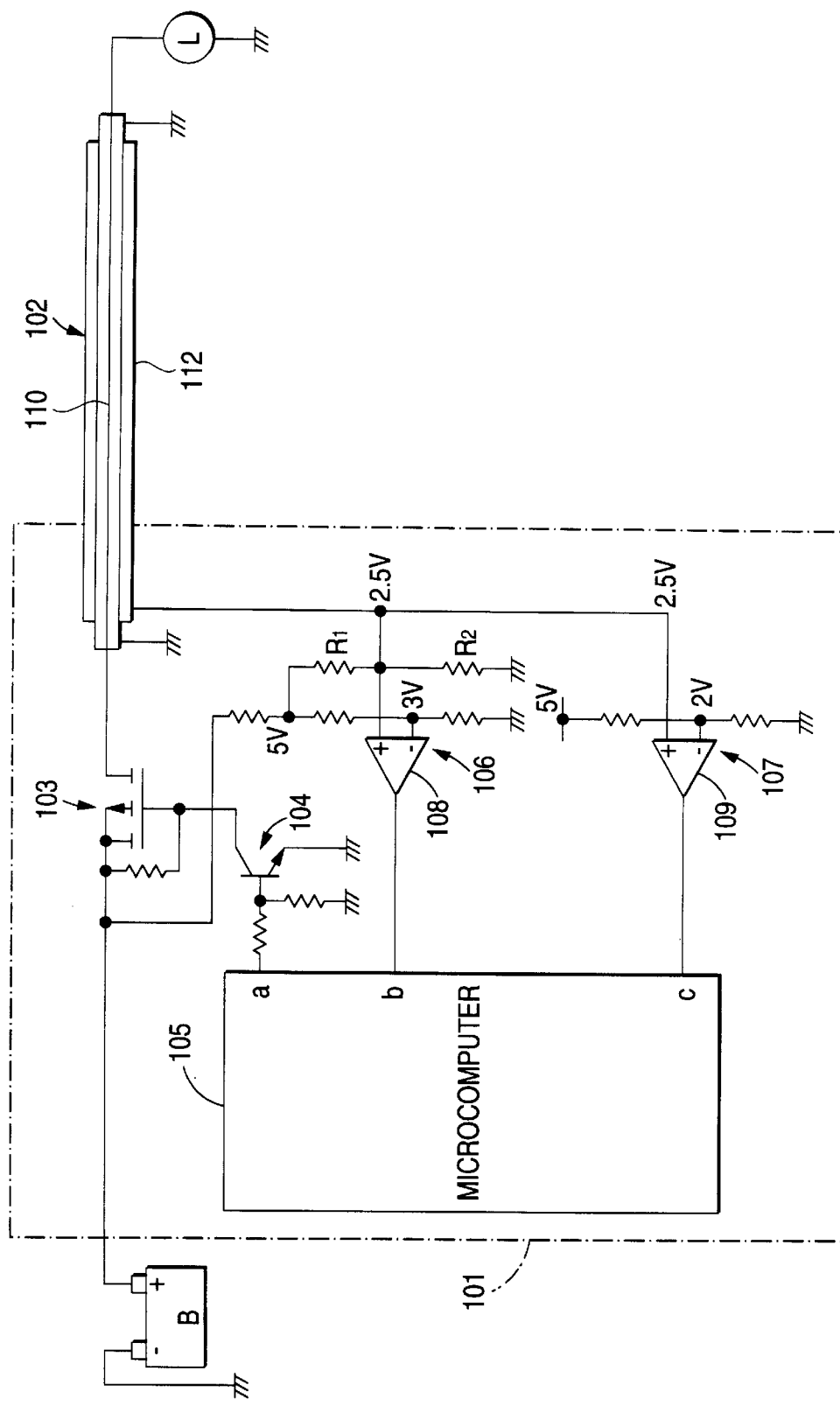
FIG. 1 is a circuit diagram showing a first embodiment of a power supply device for a motor vehicle according to the present invention.

Referring to FIG. 1, there is shown a power supply device for a motor vehicle according to a first embodiment of the present invention. As shown, current is fed from a battery B to a load L, through a power supplying unit 101 and a short detecting cable 102. Voltage of the battery B is 12 V.

The power supplying unit 101 includes a circuit breaker 103, a breaker drive circuit 104, a microcomputer 105 and voltage monitor circuits 106 and 107. A P-channel FET may be used for the circuit breaker 103. The voltage monitor circuits 106 and 107 include comparators 108 and 109, respectively. The microcomputer 105 receives signals output from the voltage monitor circuits 106 and 107 and checks an abnormality in the battery-to-load circuit on the basis of the output signals. If recognizing an abnormality in the battery-to-load circuit, the microcomputer 105 outputs an LO signal to the breaker drive circuit 104. In response to the LO signal, the breaker drive circuit 104 turns off the circuit breaker 103.

Figure 2:
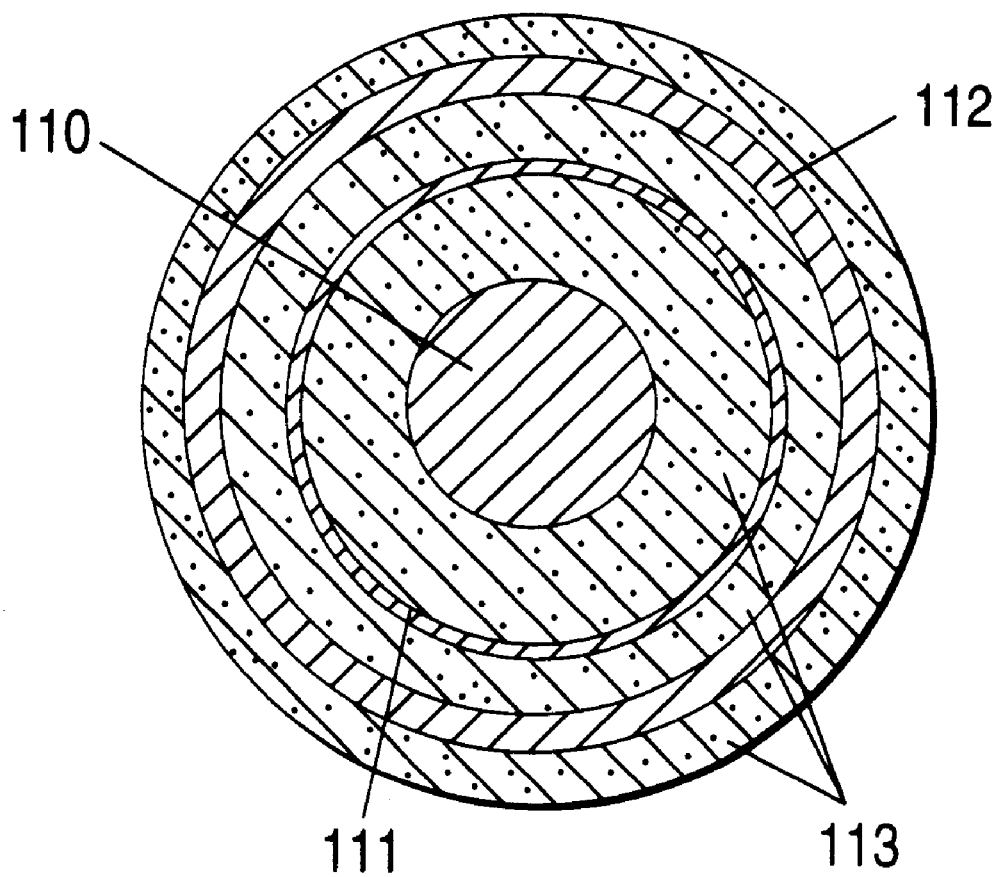
FIG. 2 is a cross sectional view showing a short detecting cable used in the power supply device.

A structure of the short detecting cable 102 is illustrated in FIG. 2. As shown, the short detecting cable 102 includes a power supplying wire 110, a shielding layer 111, a detecting layer 112, and insulating layers 113. The power supplying wire 110 is covered with an insulating layer 113, and the insulating layer 113 is covered with the shielding layer 111. The shielding layer 111 is covered with another insulating layer 113, and the insulating layer 113 is covered with the detecting layer 112. The detecting layer 112 is covered with an additional insulating layer 113.

As already referred to, the circuit breaker 103 and the power supplying wire 110 are inserted between the battery B and the load L. The circuit breaker 103 is connected through the breaker drive circuit 104 to the terminal a of the microcomputer 105. The terminals b and c of the microcomputer 105 are connected to the output terminals of the comparators 108 and 109, respectively.

The detecting layer 112 is maintained at 2.5 V through resistors R1 and R2 contained in the power supplying unit 101. The detecting layer 112 is connected to the positive terminals of the comparators 108 and 109. The negative terminals of the comparators 108 and 109 are maintained at 3 V and 2 V, respectively.

Let us consider a case where the short detecting cable 102 is abutted against a car body, the outermost insulating layer 113 is broken, and voltage of the detecting layer 112 drops to ground level. In this case, the output level of the comparator 109 varies from HI to LO (FIG. 3A). Upon receipt of the LO signal from the comparator 109, the microcomputer 105 produces an LO signal for transmission to the breaker drive circuit 104. Then, the breaker drive circuit 104 turns off the circuit breaker 103, to thereby interrupt the feeding of current from the battery to the power supplying wire.

In a case where the detecting layer 112 is brought into contact with another power supplying wire, voltage of the detecting layer 112 rises to 12 V (FIG. 3B). The output level of the comparator 108 varies from LO to HI. As a result, the microcomputer 105 produces an LO signal at the terminal a, so that the current feeding from the battery to the power supplying wire is interrupted.

The detecting layer 112 is maintained at the preset voltage through the resistor R1. Therefore, it will never burn up when a short circuit is set up in the battery-to-load circuit.

With provision of the shielding layer 111, the detecting layer 112 is protected against an adverse effect by a voltage variation in the power supplying wire 110.

To prevent an erroneous operation of the power supplying unit 101, the power supplying unit may be arranged such that when a variation of the voltage of the detecting layer 112 continues for a preset period of time or the voltage of the detecting layer 112 varies a preset number of times or larger for a preset period, such a circuit condition is recognized as occurrence of a short. In this case, the unit time of the sampling of the voltage variation must be set to be within a rare short time.

Figure 4:
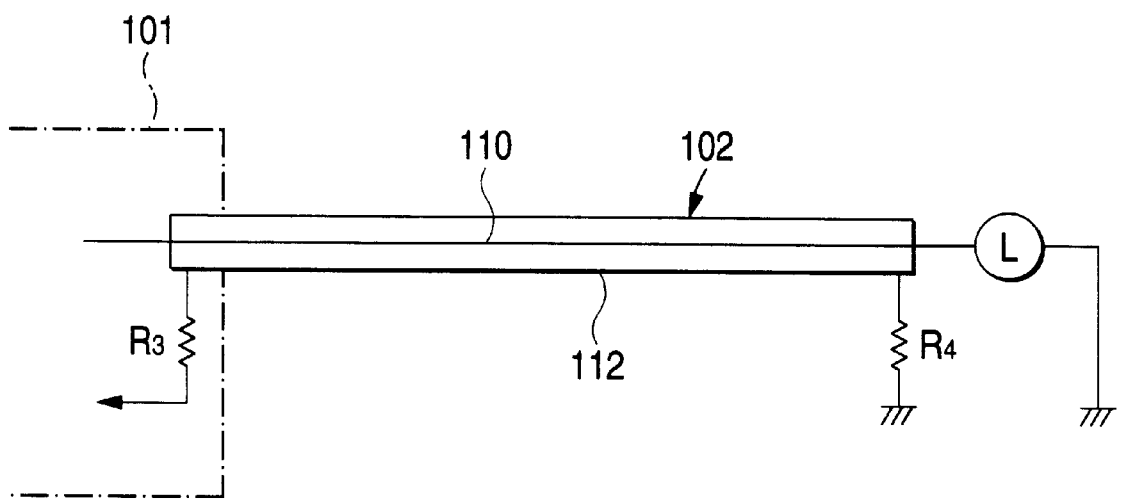
FIG. 4 is a diagram showing a part of a modification of the first embodiment of the present invention.

A modification of the above-mentioned embodiment of the invention is shown in FIG. 4. In the modification, a pull-up resistor R3 is connected to the end of the detecting layer 112 that is closer to the power supplying unit 101, while a pull-down resistor R4 is connected to the end of the detecting layer 112 that is closer to the load L. With provision of those resistors, the voltage of the detecting layer 112 is maintained at a fixed voltage (e.g., 2.5 V). The modification enables the detecting layer 112 to detect a disconnection of the detecting layer 112.

As seen from the foregoing description, the detecting layer covering the power supplying wire is maintained at a fixed voltage by means of external resistor means. A short is detected on the basis of a variation of the voltage of the detecting layer. Therefore, the power supply device of the invention can prevent the detecting layer or the power supplying wire from burning up when a rare short occurs.

The power supply device may be arranged such that the detecting layer is maintained at a fixed voltage by resistor means connected to the ends of the detecting layer that are closer to the power supply side and the load side. The power supply device thus arranged can detect a disconnection of the detecting layer.

The shielding layer, if provided between the power supplying wire and the detecting layer, makes the detecting layer free from the influence of a current variation in the power supplying wire.

Second Embodiment

Figure 5:
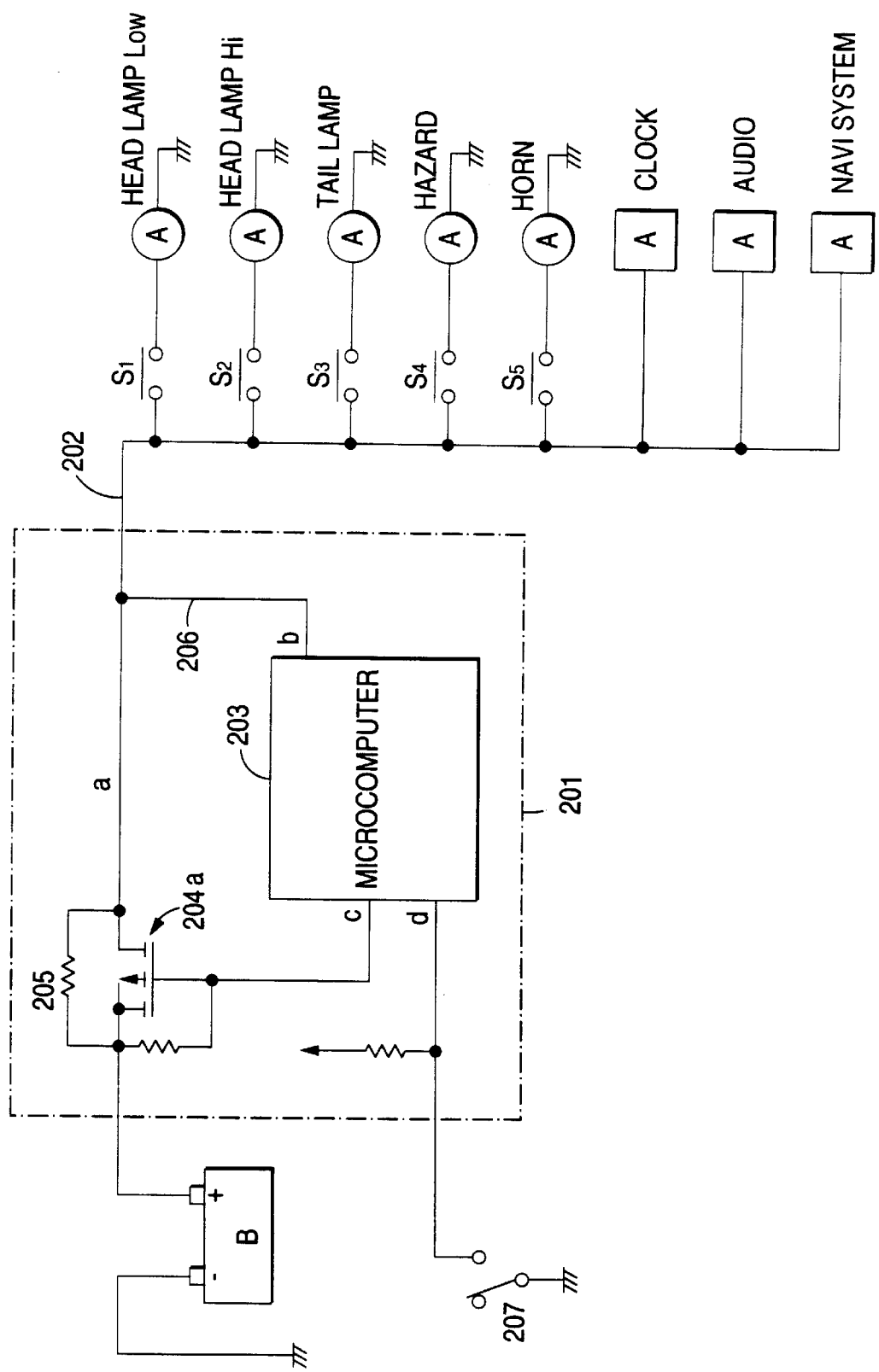
FIG. 5 is a circuit diagram showing a power supply device according to a second embodiment of the present invention.

Referring to FIG. 5, there is shown a power supply device for a motor vehicle according to a second embodiment of the present invention. As shown, current is fed from a battery B to a load L, through a power supplying unit 201 and an electric power supplying wire 202. The auxiliary devices A are generally classified into those requiring large current, such as head lamps and tail lamps, and those requiring small current, such as a clock and a radio.

The power supplying unit 201 has a microcomputer 203 and a circuit breaker 204a which includes a semiconductor switch (e.g., a P-channel FET). A parallel circuit consisting of the circuit breaker 204a and a resistor 205 is inserted between a battery B and the power supplying wire 202.

A line 206 lead from the power supplying wire 202 is connected to the terminal b of the microcomputer 203. The microcomputer 203 is connected at the terminal c to the circuit breaker 204a, and at the terminal d to an ignition switch 207. The microcomputer 203 produces an LO signal or a HI signal in accordance with an input voltage applied to the terminal c or d thereof. The circuit breaker 204a is turned on when receiving an LO signal, and turned on when receiving an HI signal.

In the power supply device, when the ignition switch 207 is in an off state, the circuit breaker 204a is in an off state. Current is fed through the resistor R5 to the auxiliary device, such as a clock, which requires a constant power supply. A resistance value of the resistor R5 is selected so as to satisfy the following conditions: 1) The voltage drop across the resistor R5 does not affect the clock, for example, and 2) the covering of the electric power supplying wire does not burn up when a short occurs. The loss by the resistor R5 is within a tolerable range.

Figure 6:
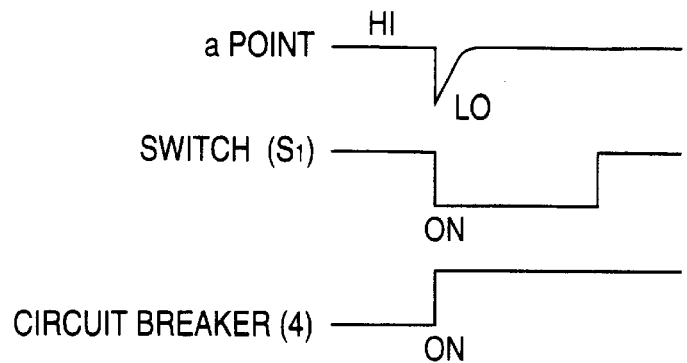

If the switch S1 of a head lamp low beam is turned on in this state, potential at a point a downstream of the circuit breaker 204a varies from a high potential to a low potential as shown in FIG. 6. A LO signal is input to the terminal b of the microcomputer 203. In response to the LO signal, the microcomputer 203 produces an LO signal at the terminal c thereof. In turn, the circuit breaker 204a is turned on, so that a current is fed to the power supplying wire 202, and the head lamp low beam is lit on.

Figure 7:
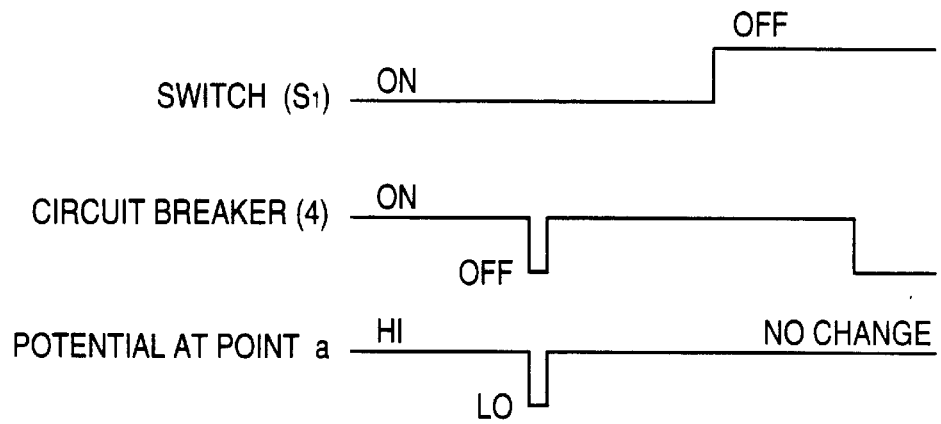
FIG. 7 shows a set of waveforms showing a detection of an on state of the switch which ensues from a voltage variation.

The microcomputer 203 pulls up the potential at the terminal c thereof to an HI level for a very short time, and turns off the circuit breaker 204a as shown in FIG. 7. In this state, the microcomputer checks a state of the switch S1. In this case, the off time duration of the circuit breaker 204a is selected to be such a short time as not to affect the operation of the auxiliary devices A.

When the circuit breaker 204a is turned off, if the switch S1 is in an on state, the potential at the point a drops from a high potential to a low potential. In turn, the input signal to the terminal b of the microcomputer 203 is an LO signal, and the output signal at the terminal c is an LO signal. Then, the circuit breaker 204a is turned on again. This check is periodically repeated so long as the switch S1 is in an on state. When the switch S1 is turned off, the potential at a point a remains high, and the circuit breaker 204a is left in an off state.

When the ignition switch 207 is turned on, the input signal to the terminal d of the microcomputer 203 is an LO signal, and an LO signal appears at the terminal c of the microcomputer and the circuit breaker 204a is turned on. During an on state of the ignition switch 207, an on state of the circuit breaker 204a continues.

When the circuit breaker 204a is turned on, if an input signal to the terminal b of the microcomputer, which should be at high potential, goes low in potential, the microcomputer 203 judges that a short has occurred in the power supplying wire 202, and turns off the circuit breaker 204a.

Figure 8:
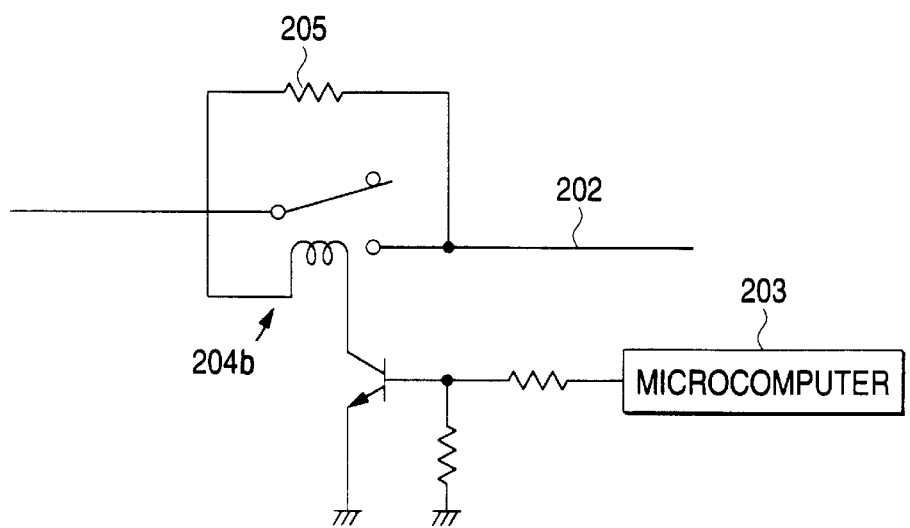
FIG. 8 is a circuit diagram showing a modification of the second embodiment in which a relay is used for the circuit breaker.

The semiconductor switch of the circuit breaker 204a may be substituted by a relay circuit breaker 204b as shown in FIG. 8.

As seen from the foregoing description, in the power supply device, a parallel circuit consisting of the circuit breaker and a resistor is inserted between a battery and auxiliary devices. Therefore, if the circuit breaker is turned off, current flows through the resistor to the power supplying wire, from the battery. Because of this, when a short occurs, the covering of an electric power supplying wire does not burn up. If necessary, large current may be fed to the auxiliary devices by turning off the circuit breaker.

Third Embodiment

The preferred embodiment of a power supply device for a motor vehicle according to the present invention will be described with reference to the accompanying drawings.

Figure 9:
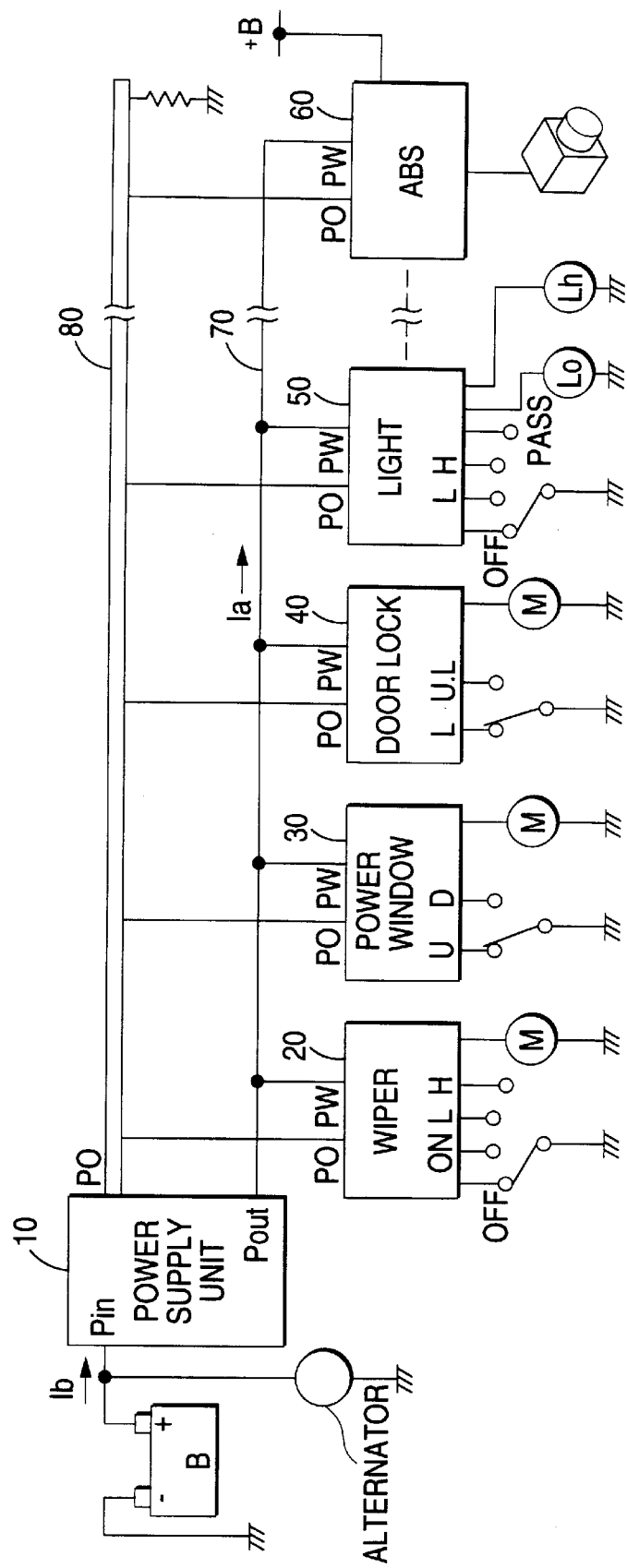
FIG. 9 is a block diagram showing a power supply device according to a third embodiment of the present invention.

As seen from a block diagram shown in FIG. 9, the power supply device of the invention includes a power supply unit 10 connected to a battery B, and a plural number of control units 20 to 60 connected to the power supply unit 10 through a current feeding line 70 and a multi-signal line 80.

The power supply unit 10 is made up of a microcomputer 11, a current detecting circuit 12, a shunt resistor Rs, a power source relay RL, a relay driver circuit 13, and transmit/receive interfaces 14 and 15. Further, the power supply unit 10 is provided with a power input Pin connected to the battery B, a power output Pout connected to a current supplying wire 70, and an external connection port PO.

The power input Pin is connected to one end of a series circuit consisting of the power source relay RL and the shunt resistor Rs, and the power output Pout is connected to the other end of the series circuit. The power source relay RL allows and prohibits the supply of current to the control units 20 to 60, connected to the power output Pout.

Figure 10:
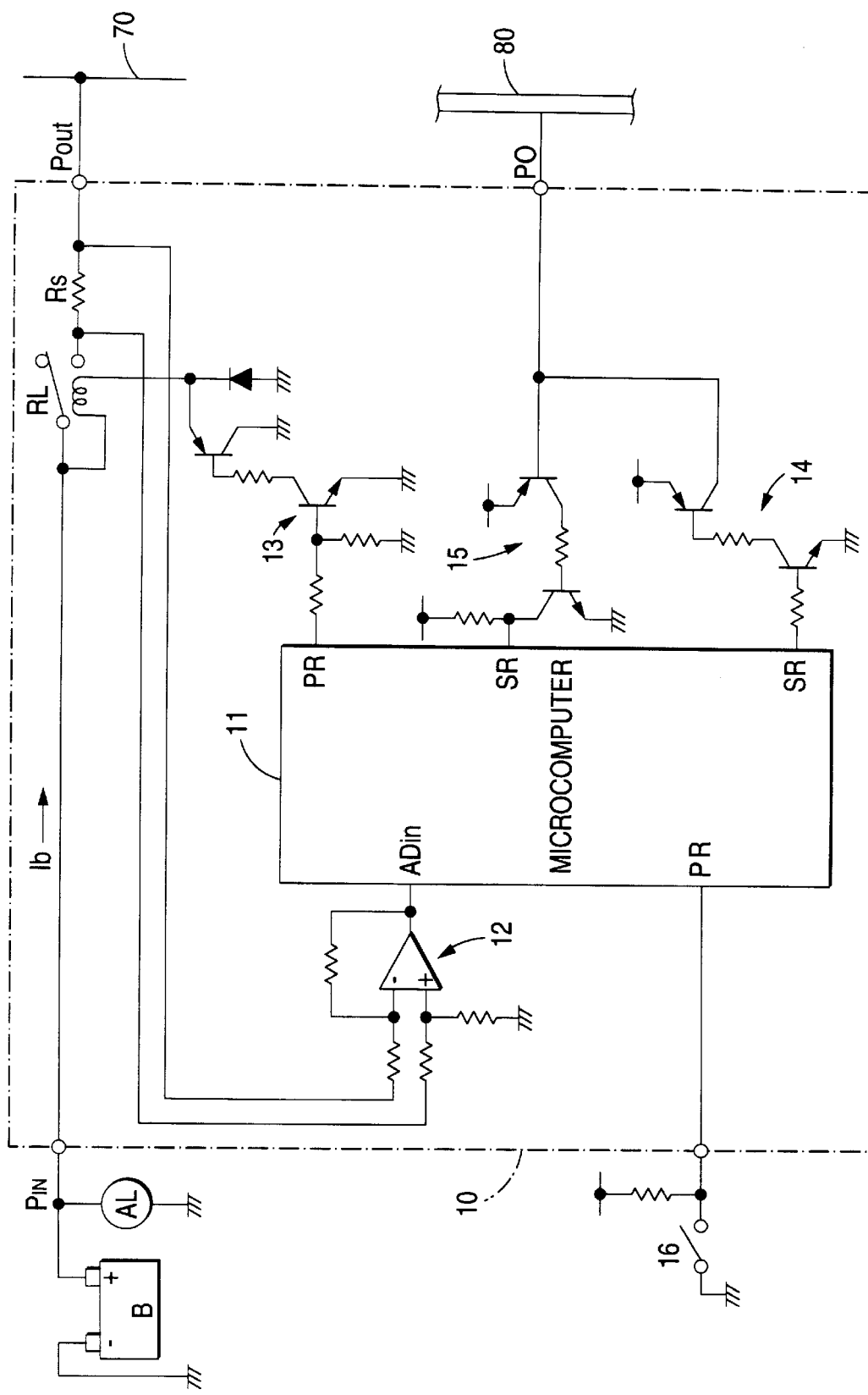
FIG. 10 is a circuit diagram showing a power supply unit in the power supply device of FIG. 9.

The shunt resistor Rs is a resistor for detecting current. A resistance value of the resistor is small. One end of the shunt resistor Rs is connected to the noninverting input terminal of an operation amplifier of the current detecting circuit 12, while the other end thereof is connected to the inverting input terminal of the operational amplifier (FIG. 10). The output terminal of the operational amplifier is connected to the input terminal of an A/D converter contained the microcomputer 11. The microcomputer 11 A/D converts a voltage drop across the shunt resistor Rs, and can constantly monitor a value of current supplied from the battery B using the A/D converted voltage drop.

While in the present embodiment, the shunt resistor Rs is inserted in the current path in order to detect the current supplied from the battery, such a magnetic sensor as a Hall element may be used for the same purpose, in place of the shunt resistor Rs.

In the present embodiment, the microcomputer 11 is a one-chip microcomputer package containing the A/D converter contained connected to the current detecting circuit 12, parallel ports PR for the data transfer to and from the external circuits, serial ports SR for communication, a memory, and the like. A switch 16 and the relay driver circuit 13 are connected to the input/output parallel ports PR, respectively. The transmit/receive interfaces 14 and 15 are connected to the serial ports SR, respectively.

The switch 16 is a setting switch for storing a current value input to an A/D converter input ADin into the microcomputer 11. This switch will be described in detail later.

The relay driver circuit 13 is connected to the power source relay RL. The relay driver circuit 13 drives the power source relay RL under control of the microcomputer 11 to allow and prohibit the supply of current from the battery to the current supplying wire 70.

The transmit/receive interfaces 14 and 15, which are connected to the external connection port PO that is connected to the multi-signal line 80, transmits and receives data to and from the control units 20 to 60.

The control units 20 to 60 are provided in association with the electrical devices, respectively. Accordingly, those control units are, for example, a wiper control unit 20, a power window control unit 30, a door-lock control unit 40, a light control unit 50, an ABS control unit 60, and the like. Those control units 20 to 60 are connected in parallel to the current supplying wire 70 and the multi-signal line 80 (of the bus type).

Figure 11:
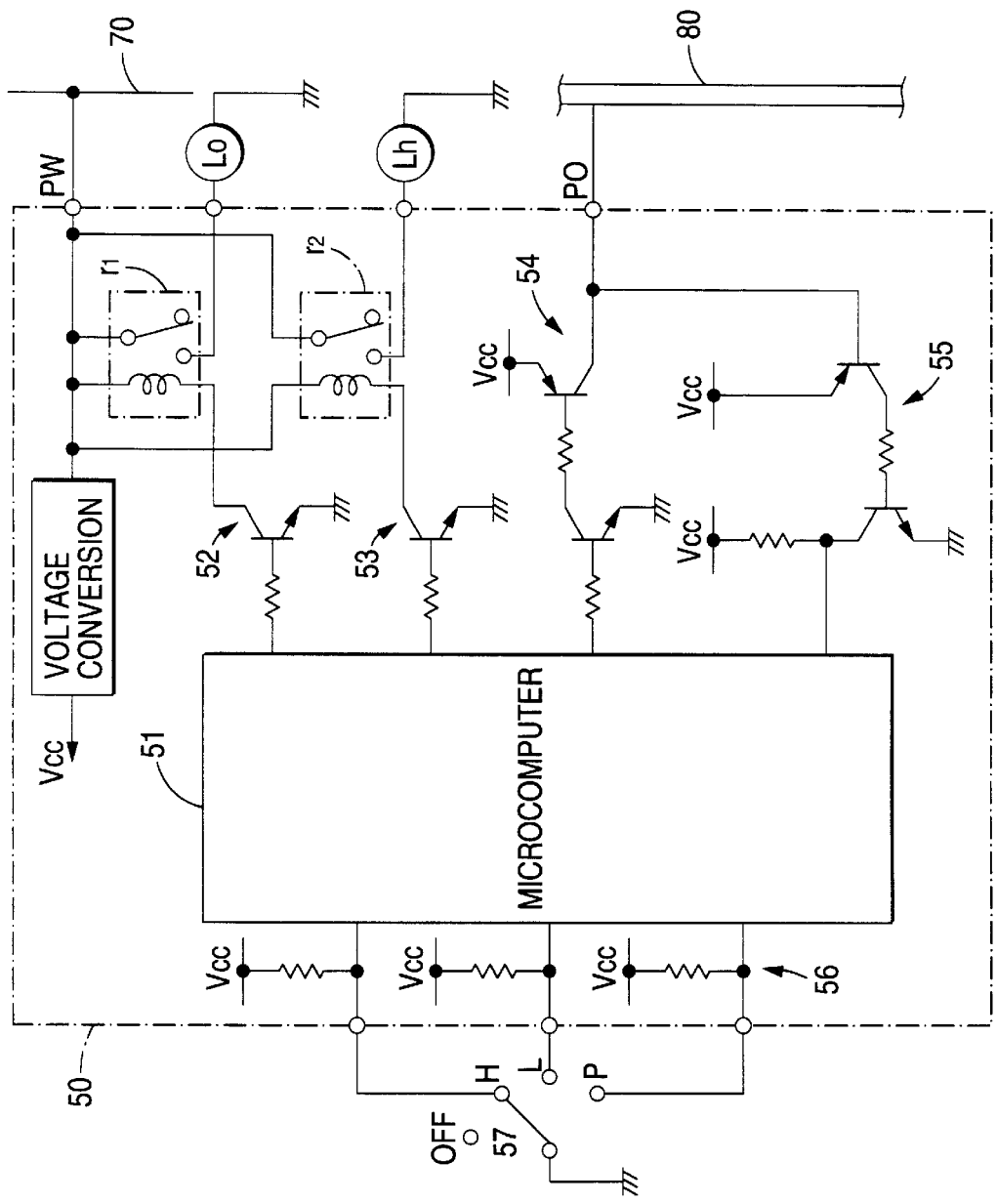
FIG. 11 is a circuit diagram showing a light control unit in the power supply device of FIG. 9.

The detailed arrangement of the light control unit 50 is typically illustrated in FIG. 11. This arrangement is correspondingly applied to the arrangements of the remaining control units 20 to 40, and 60. As shown, the light control unit 50 is made up of a one-chip microcomputer 51, drive relays (referred to as light-on relays) r1 and r2, relay drive circuits 52 and 53, transmitting and receiving interface circuits 54 and 55, a switch input circuit 56, and the like. Further, the control unit is provided with a power source input PW and an external connection port PO.

In the light control unit 50 shown in FIG. 11, the light-on relays r1 and r2 are inserted between the current supplying wire 70 and high and low beam lamps Lh and Lo, are connected to the output port of the one-chip microcomputer 51, through the relay drive circuits 52 and 53. The one-chip microcomputer 51 controls the selection of a desired beam lamp, the high beam lamp Lh or the low beam lamp Lo, and the light-on/off of these lamps by driving the light-on relays r1 and r2.

For the controls of the lamp selection and the light-on/off, three inputs (high, low and passing) are contained in the switch input circuit 56 in the one-chip microcomputer 51. These inputs are connected to a light switch 57 that can be accessed by a driver. When a signal goes low in level at any of those inputs, the one-chip microcomputer 51 recognizes its low level signal and executes a process based on the low level signal. When the high input H is selected, the light-on relay r2 operates to light on the high beam lamp Lh. When the low input L is selected, the light-on relay r1 operates to light on the low beam lamp Lo. When the passing input P is selected, the light-on relays r1 and r2 are interruptively operated to light on and off the lamps Lh and Lo in a flashing manner.

Also in other control units 20 to 40, and 60, the drive relays therein are connected to a wiper motor, a power window motor, a door-lock motor, and an ABS actuator, respectively. The one-chip microcomputers 51 contained in the control units control the turn-on/off of the motors and the actuator.

Switch input circuits are contained also in the one-chip microcomputers 51 of the control units 20 to 40, and 60. The switch input circuits are connected to operation switches that can be accessed by a driver. In the wiper control unit 20, for example, three inputs (high, low and passing) are provided in the one-chip microcomputer 51. Those inputs are connected to driver accessible operation switches. The one-chip microcomputer 51 recognizes a state of the wiper operation switch and performs a process based on the state of the switch. The same thing is true for the power window control unit (up and down), . . . , the door-lock control unit (lock and unlock).

The one-chip microcomputer 51 in each of the control units 20 to 60 is connected through the interface circuits 54 and 55 to the external connection port PO that is connected to the multi-signal line 80. A LAN protocol of the CSMA/CD (carrier sense access with collision detection) type, for example, is installed in the one-chip microcomputer 51 of each of the control units 20 to 60 and the power supply unit 10. Those units are interconnected to form a LAN network.

Addresses are assigned to the power supply unit 10, and the control units 20 to 50, respectively. Operating states of the control units 20 to 60, for example, high, low or passing of the head lights in the case of the light control unit 50, are transmitted in the form of data to the power supply unit 10, through the multi-signal line 80.

Thus, in the present embodiment, information of many control units 20 to 60 can be transmitted by one multi-signal line 80. Accordingly, an increase of the number of wires is minimized.

The CSMA/CD protocol will briefly be described. The procedure of data transmission in the protocol is:

1) A terminal which will transmit data monitors a bus as a data transmission medium and confirms that data transmitted from other terminals is not present on the bus.
2) If the bus is not used, the transmitting terminal waits for a time corresponding to a minimum time interval between the frames, and sends data. At this time, the remaining terminals check the bus. If data are present on the bus and any of the terminals finds data destined for the terminal itself, the terminal receives the data destined for the terminal itself, and casts the data destined for other terminals.
3) The transmitting terminal constantly monitors the bus during the data transmission, and checks whether or not data collision is present.
4) If data collision is present, the transmitting terminal sends a jam signal and stops the data transmission, and waits for a preset time determined by random numbers and sends data again.

Thus, when the CSMA/CD protocol is used, the respective terminals can perform data transmissions through a single data transmission path while avoiding data collision.

The power supply device for a vehicle is thus arranged and an operation of the power supply device will be described.

In the power supply device, a data table is formed in the memory of the microcomputer 11. The values of the current Ia consumed by the control units 20 to 60 are stored in the data table. An example of the contents of the data table is shown below.

| | |
|---|---|
| Wiper motor | 7A |
| Power window motor | 5A |
| Door-lock | 2A |
| Light Lo | 5A |
| Light Hi | 6A |
| ABS unit | 1A |

The microcomputer calculates the current Ia consumed by the load units when those units operate on the basis of the data representative of operating states, which are received from the load units by way of the multi-signal line 80. As recalled, the load units are the control units 20 to 60, i.e., the wiper control unit 20, the power window control unit 30, the door-lock control unit 40, the light control unit 50, and the ABS control unit 60. Then, the microcomputer compares the calculated consumption current Ia with a current Ib that is supplied from the battery B and flows through the shunt resistor Rs. If the current Ib is too large or small, the microcomputer stops the supply of the current from the battery B to the control units 20 to 60.

The above-mentioned process carried out by the microcomputer will be described sequentially from a stage of starting up the car (initial stage) and the subsequent ones.

At the time of starting up the engine, if the key is in an off state, the power supply unit is also in an off state and the contact of the power source relay RL is open.

In this state, the key is turned on. Then, current is supplied to the power supply unit 10 which in turn starts to operate. The power supply unit 10 checks whether or not signals representative of operating states have been transmitted from the control units 20 to 60 are present on the bus, according to the CSMA/CD protocol. At this time, the contact of the power source relay RL remains open, and hence no current flows through the shunt resistor Rs. Therefore, no current flows into the current supplying wire 70, and the consumption current Ia of the control units 20 to 60 is also zero.

In this state, no data is transmitted from the control units 20 to 60. The consumption current Ia that the power supply unit 10 calculates referring to the data table is also zero.

At this time, the power supply unit 10 detects the current flowing through the shunt resistor Rs by the current detecting circuit 12, and detects a current supplied from the battery B by A/D converting the detected current. However, the detected supplying current Ib is also zero since no current flows through the shunt resistor Rs as already stated. Accordingly, Ia=Ib, and Ia>Ib does not hold, then the power supply unit 10 renders the contact of the power source relay RL close, so that the battery B is connected to the current supplying wire 70, and current is supplied to the control units 20 to 60.

At this time, if Ia>Ib, the power supply unit 10 judges that a short occurs, and denergizes the power source relay RL to open its contact. Accordingly, the supply of current is interrupted.

Thus, when current is fed, the control units 20 to 60 are placed to an standby mode and accepts the switch inputs.

In this state, if the light switch 57 is turned to a position Lo, the one-chip microcomputer 51 of the light control unit 50 recognizes the switch having been turned to the position Lo, and energizes the light-on relay r1 to light on the low beam lamp Lo. Simultaneously with the lighting on the low beam lamp Lo, the microcomputer sends data indicating that the low beam lamp Lo has been lit up to the multi-signal line 80 through the transmitting interface circuit 54. At this time, the one-chip microcomputer 51 of the light control unit 50 monitors the multi-signal line 80 by the receiving interface circuit 55 according to the CSMA/CD protocol, and confirms that no data from the control units 20 to 60 is present on the multi-signal line. Then, the microcomputer sends data.

The data, which is thus sent from the light control unit 50 to the multi-signal line 80, is received by the power supply unit 10 that is monitoring the multi-signal line 80. The power supply unit specifies the consumption current Ia in the data table by the received data, and reads the specified current from the data table.

The power supply unit 10 constantly monitors the supplying current Ib actually flowing into the current supplying wire 70 while using a detecting signal that is output from the current detecting circuit 12 and input to the A/D converter input ADin. Then, it compares the detected supplying current Ib with the consumption current Ia. When Ia (required consumption current)>Ib (actual supplying current) (for example, Ia=5 A and Ib=4 A), that is, the supplying current Ib is smaller than the consumption current Ia, there is no danger that a short or a rare short takes place in the battery-to-load circuit. Therefore, the power supply unit 10 continues the current supply while leaving the power source relay RL energized.

When Ia<Ib, that is, the supplying current Ib is larger than the consumption current Ia (for example, Ia=5 A and Ib=6 A), there is a possibility that a short or a rate short occurs and hence an abnormal current flows in the battery-to-load circuit. Therefore, the power supply unit 10 deenergizes the power source relay RL to shut off the supplied current flow.

When Ia>>Ib, that is, the supplying current Ib is excessively smaller than the consumption current Ia (for example, Ia=5 A and Ib=0.1 A), there is a possibility that no current flows because of a disconnection of the wire. Therefore, the power supply unit 10 deenergizes the power source relay RL to shut off the current flow.

Thus, the power supply device constantly monitors the current supplied from the battery B. When the power supply device recognizes that the supplying current Ib is excessively larger or smaller than the consumption current Ia to be consumed by the control units 20 to 60, the power supply device shuts off the current supply from the battery B.

When the light switch 57 is turned to an OFF position and the light control unit 50 stops its operation, the microcomputer 51 of the light control unit 50 recognizes that the switch 57 has been set at the OFF position, and deenernizes the light-on relay r1 to light off the low beam lamp Lo, while at the same time sends data indicative of the lighting off of the low beam lamp Lo to the multi-signal line 80 through the transmitting interface circuit 54.

The power supply unit 10 receives the light-off data through the multi-signal line 80, and recognizes that the light control unit 50 stops its operation. Then, it reads the consumption current Ia of other control units than the light control unit 50 from the data table, and compares the read out consumption current Ia with the supplying current Ib. In this instance, only the light control unit 50 had operated. Therefore, the consumption current Ia is 0. If it takes any other value than 0, the microcomputer 51 judges that an abnormal current flows, and deenergizes the power source relay RL to interrupt the supply of current.

In the above-mentioned instance, the operating control unit is only one control unit, or the light control unit 50. Let us consider a case where two or more number of control units of those control units 20 to 60 operate. In this case, the operating control units send data indicative of their operation to the bus, or the multi-signal line. The power supply unit 10 receives the data through the multi-signal line, and reads the consumption currents Ia of the operating control units from the data table and sums the read out consumption currents Ia to obtain the consumption current Ia consumed by those operating control units. Then, the power supply unit 10 compares the obtained consumption current Ia with an actual supplying current Ib flowing through the current supplying wire 70, detected by the current detecting circuit 12.

In case where the wiper unit 20, the power window unit 30, the door-lock unit 40, and the light unit (e.g., Lo) 50 concurrently operate, the power supply unit reads the consumption current 7A, 5A, 2A and 5A out of the data table, and sums those current values. Then, the power supply unit recognizes the sum of the current values, or 19A, as the total current Ia consumed in this case, and compares it with the supplying current Ib flowing through the shunt resistor Rs. If Ia>Ib, the power supply unit judges that a normal current flows, and continues the supply of current while energizing the power source relay RL. If Ia<Ib or Ia>>Ib, the power supply unit 10 judges that a short or a wire disconnection occurs and an abnormal currents flows, and deenergizes the power source relay RL to shut off the current flow.

In case where one of the operating control units 20 to 50 stops its operation, the power supply unit reads out of the data table the consumption current of other control units than the control unit whose operation stops, sums those current values and compares the sum of the values of the consumption current Ib with an actual consumption current Ia.

Let us consider a specific example where the wiper unit 20 stops its operation and its associated control unit sends data indicative of the stopping of the wiper unit operation to the multi-signal line 80. In this example, the power supply unit 10 reads out of the data table the current values 5A, 2A and 5A of the current consumed by the operating units, the power window unit 30, the door-lock unit 40 and the light unit (e.g., Lo) 50 other than the wiper unit whose operation stops. Then, the power supply unit 10 sums those current values to obtains the consumption current Ia to be consumed, and compares the calculated consumption current Ia with an actual supplying current Ib flowing through the current supplying wire 70. If Ia>Ib, the power supply unit judges that a normal current flows, and continues the supply of current while energizing the power source relay RL. If Ia<Ib or Ia>>Ib, the power supply unit judges that a short or a wire disconnection occurs and an abnormal current flows, and deenergize the power source relay RL to shut off the current flow.

When the control units 60 and 70 operate, the power supply unit 10 reads out of the data table the current values of the current consumed by the units associated with the control units whose operation stops, the power supply unit 10 reads the consumption current values of the control units 60 and 70 from the data table, sums them to obtain the consumption current Ia to be consumed, and compares the thus calculated consumption current Ia with an actual supplying current Ib flowing through the current supplying wire 70. If Ia>Ib, the power supply unit judges that a normal current flows, and continues the supply of current while energizing the power source relay RL. If Ia<Ib or Ia>>Ib, the power supply unit judges that a short or a wire disconnection occurs and an abnormal current flows, and deenergize the power source relay RL to shut off the current flow.

As described above, the power supply device of the embodiment constantly monitors operating states of the control units sent from the control units 20 to 60, and calculates the consumption current Ia to be consumed by the operating control units of those load units on the basis of the operating states. Then, the power supply device constantly compares the calculated consumption current Ia with an actual supplying current Ib, whereby the power supply device constantly detects an abnormal current flow. When a power supplying wire is disconnected or a rare short occurs in which the exposed part of the wire comes in contact with the car body many times for a short time period, the power supply device of the invention can smoothly deal with such a trouble.

When the control units for driving lamps or motors, such as the light control unit 50 and the power window control unit 30, operate, rush current flows. If the rush current is detected and compared with the supplying current Ib, an error will be produced highly possibly. To cope with this, the power supply device of the embodiment is arranged such that the comparison is performed after the rush current settles down and a stationary state is set up, more specifically, after operating states of the load units are detected and a preset time, e.g., approximately 50 m sec., elapses.

The delay time may readily be set by a program timer under control of the microcomputer 11 of the power supply unit 10.

The data table used in the power supply unit 10 may be stored in advance in a ROM, which is additionally formed in the memory circuit of the microcomputer 11. A flash memory in which data may be written thereinto and data written thereinto may be erased, may be used in lieu of the ROM. In this case, through the operation of the switch 16, the microcomputer 11 writes a current value input to the A/D converter input ADin over the flash memory.

Where the flash memory is used for storing the data table, data in the table may easily be updated in the following manner. As described above, addresses are assigned to the control units 20 to 60 as described above. The light control unit 50 is turned on, while the remaining control units 20 to 40, and 60 are all turned off, whereby current toward only the light unit 50 flows through the current supplying wire 70. Then, the switch 16 is operated. The microcomputer 11 writes the A/D converted current value of the current flowing through the current supplying wire 70 as a new table value over the flash memory.

There is a case where an electric device is replaced with another whose specification is different from that of the former, and the consumption current consumed by the new device is different from that of the old one. In this case, the table values may easily be altered.

The power supply device can easily cope with a case where new electric devices are additionally used, in the following way. In this case, new addresses are assigned to the control units 20 to 50 respectively associated with those new electric devices. Those devices are connected to the current supplying wire 70 and the multi-signal line 80. The new control units 20 to 60 are tuned on while the old control units 20 to 60 are turned off, and the switch 16 is operated. Then, the microcomputer 11 stores the tables values for the new electric devices into the memory locations specified by the new addresses.

Margin values may be added to the A/D converted values to be written over the data table. The margin value is, for example, 20% of the related converted value. There is a case where ambient temperature rises because of outside temperature rise or generation of heat, so that the consumption current of the control units 20 to 60 is increased. In such a case, the use of the margin values prevents the microcomputer from mistakenly judging that the increase of the consumption current results from occurrence of a short.

One of the methods to realize this is to install a program to add preset offset value to updating data into the microcomputer 11.

As seen from the foregoing description, a power supply device for a motor vehicle according to the present invention constantly monitors operating states of load units connected to a car-carried battery, such as a wiper unit, a power window unit, a door lock unit, and a light unit, calculates currents to be consumed by the load units on the basis of the operating states monitored, compares the calculated consumption current of the load units with a current supplied from the battery and when the supplied current, which is excessively larger or smaller than the calculated consumption current, is detected, interrupts the supply of electric power from the battery to the associated load unit. With such an arrangement, the power supply device can detect a short and a rare short in which the exposed part of the power supplying wire comes in contact with the car body many times for a short time period, to thereby prevent the covering of a power supplying wire from burning up, and can detect a disconnection of the wire.

Fourth Embodiment

Figure 12:
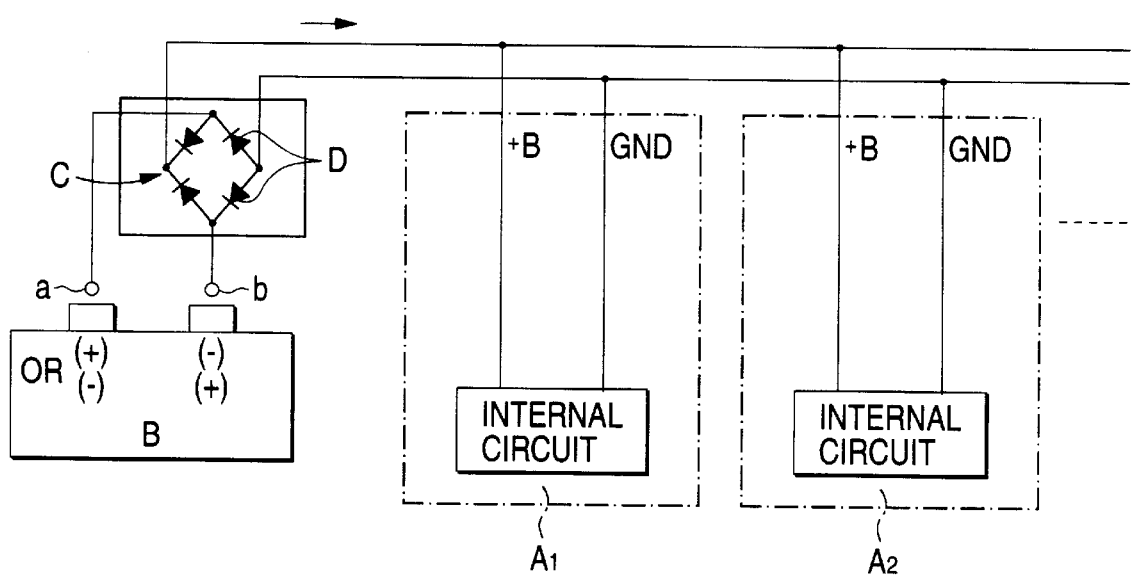
FIG. 12 is a circuit diagram showing a battery connection circuit according to a fourth embodiment of the present invention.

An embodiment of a battery connection circuit according to the fourth embodiment of the present invention will be described with reference to FIG. 12. In the embodiment, a bridge circuit C including diodes D is provided in the prestage of electric devices A1, A2, .... In the battery connection circuit, if the input terminals a and b of the bridge circuit C are connected to the positive and the negative polarities or the negative and the positive polarities of a battery B, the current of the correct polarity can be fed to the electric devices A.

In the battery connection circuit of the invention, an electric power from the battery is rectified by the bridge circuit C, and then supplied to the electric devices A. Therefore, voltage of the correct polarity is always applied to the electric devices.

As described above, the battery connection circuit of the invention can apply voltage of the correct polarity to the electric devices without regard of the polarities of the battery connected thereto. Therefore, the battery connection circuit is free from such a problem of the conventional battery connection circuit that the electric devices will be destroyed when the battery is connected in the reverse polarities.

Fifth Embodiment

The preferred embodiment of the present invention will be described with reference to the accompanying drawings.

Figure 13:
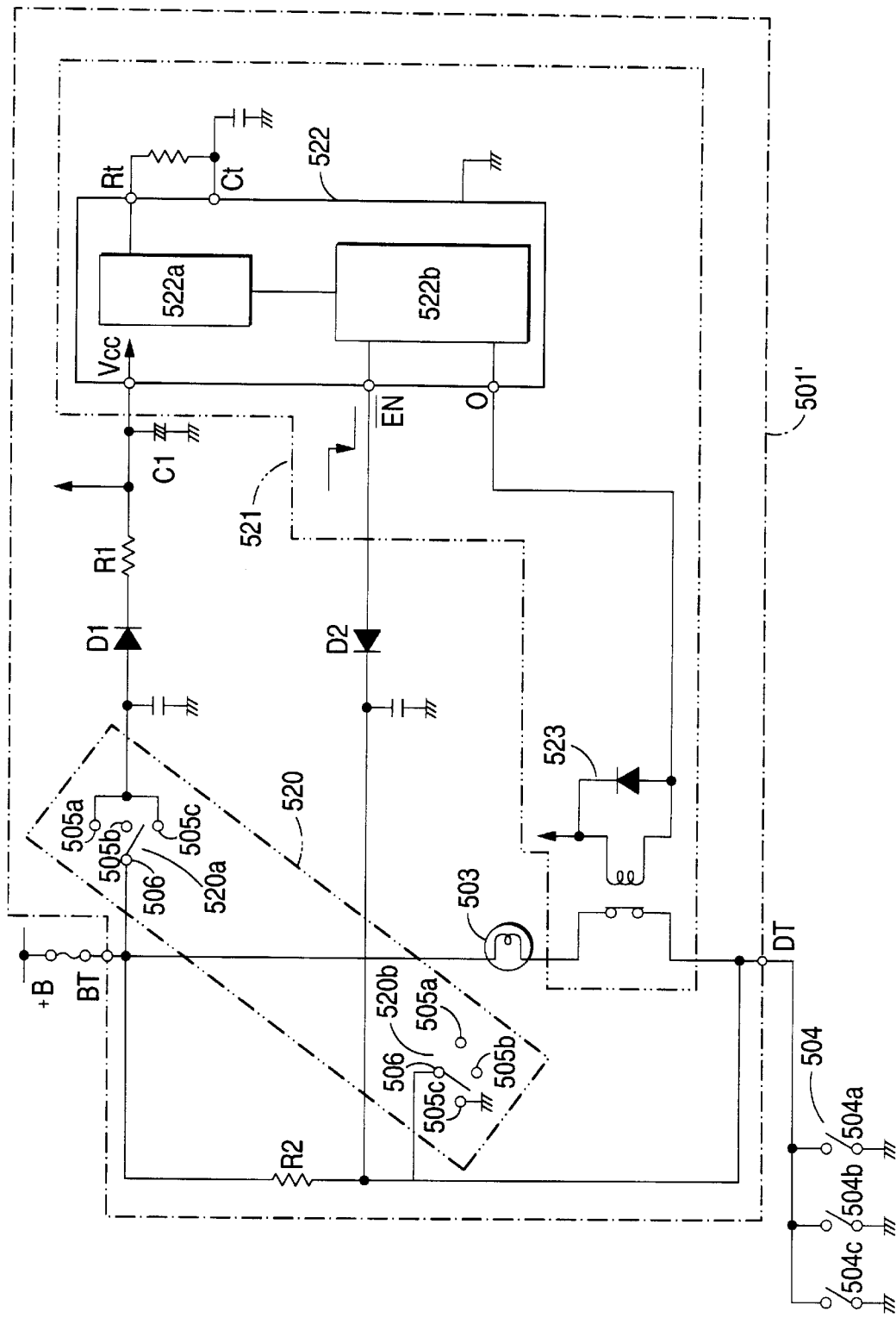
FIG. 13 is a circuit diagram showing a room lamp device for a motor vehicle according to a fourth embodiment of the present invention.
Figure 17:
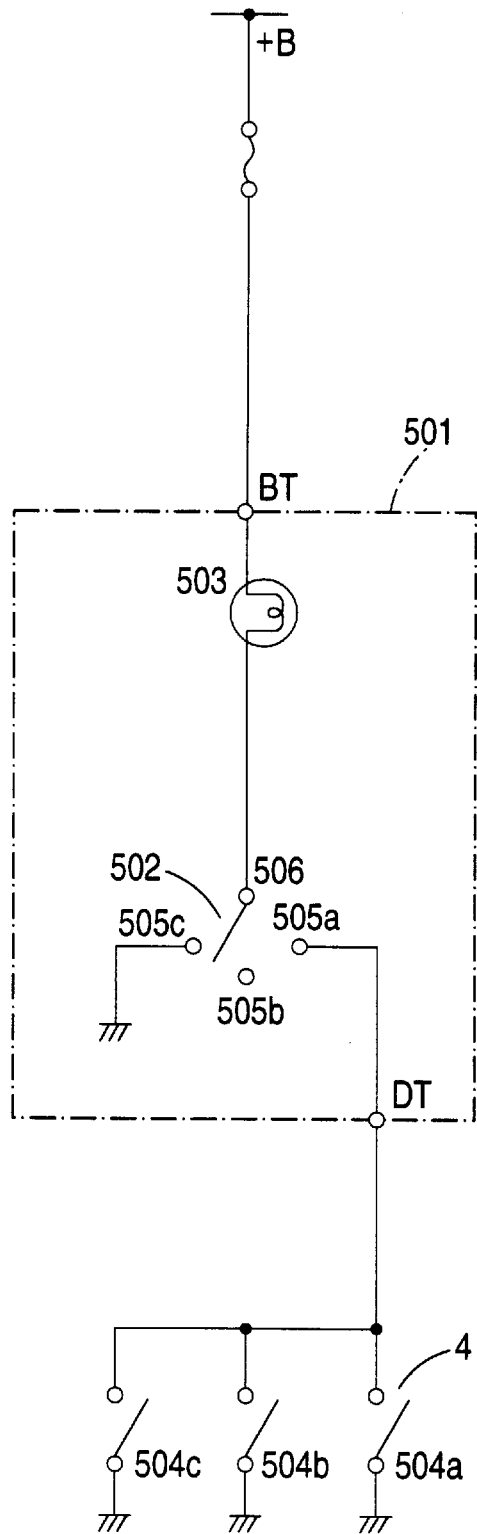
FIG. 17 is a circuit diagram showing a circuit of a conventional room lamp device for a motor vehicle.
Figure 18:
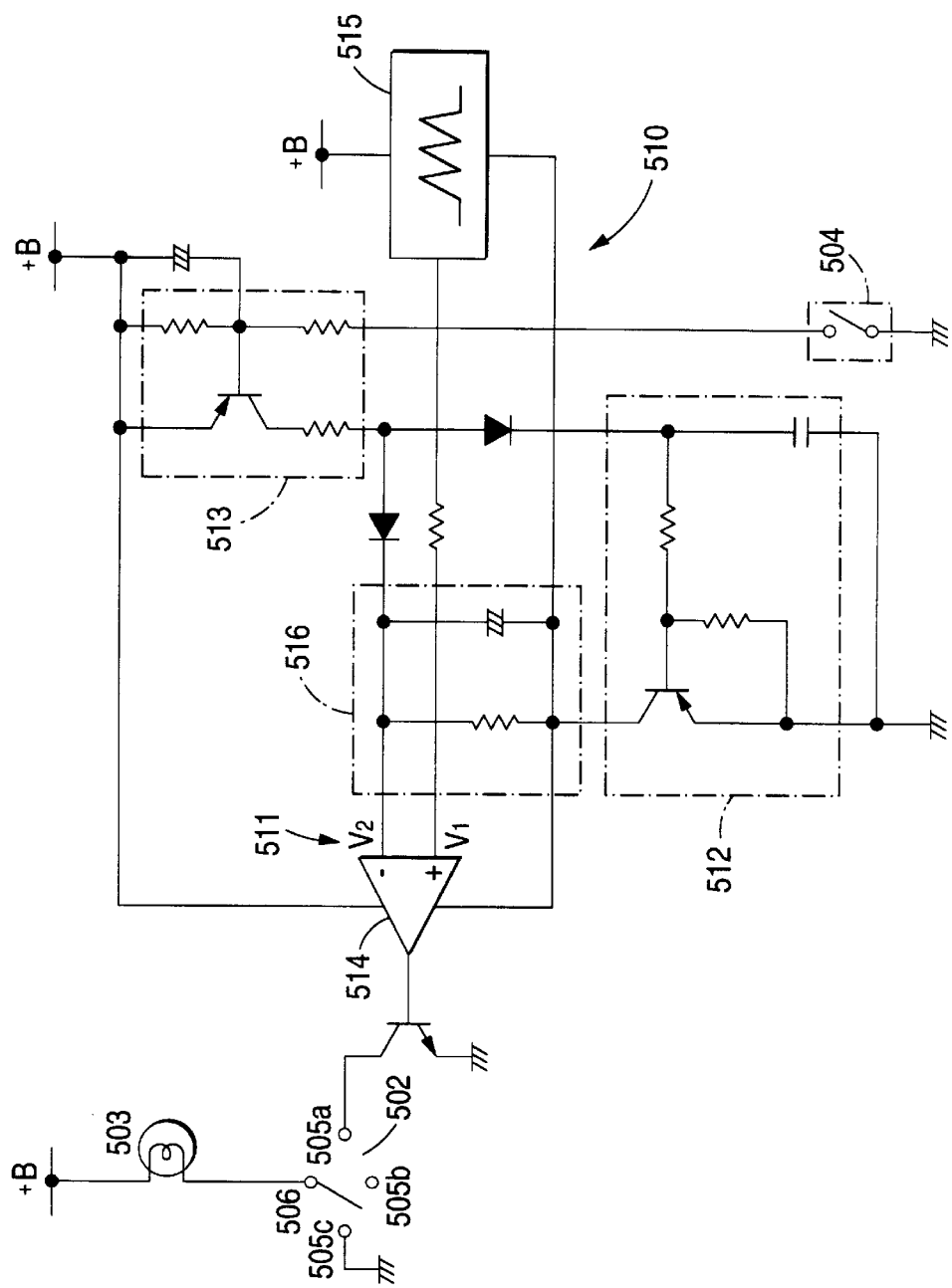
FIG. 18 is a circuit diagram showing a conventional room illumination device.
Figure 19:
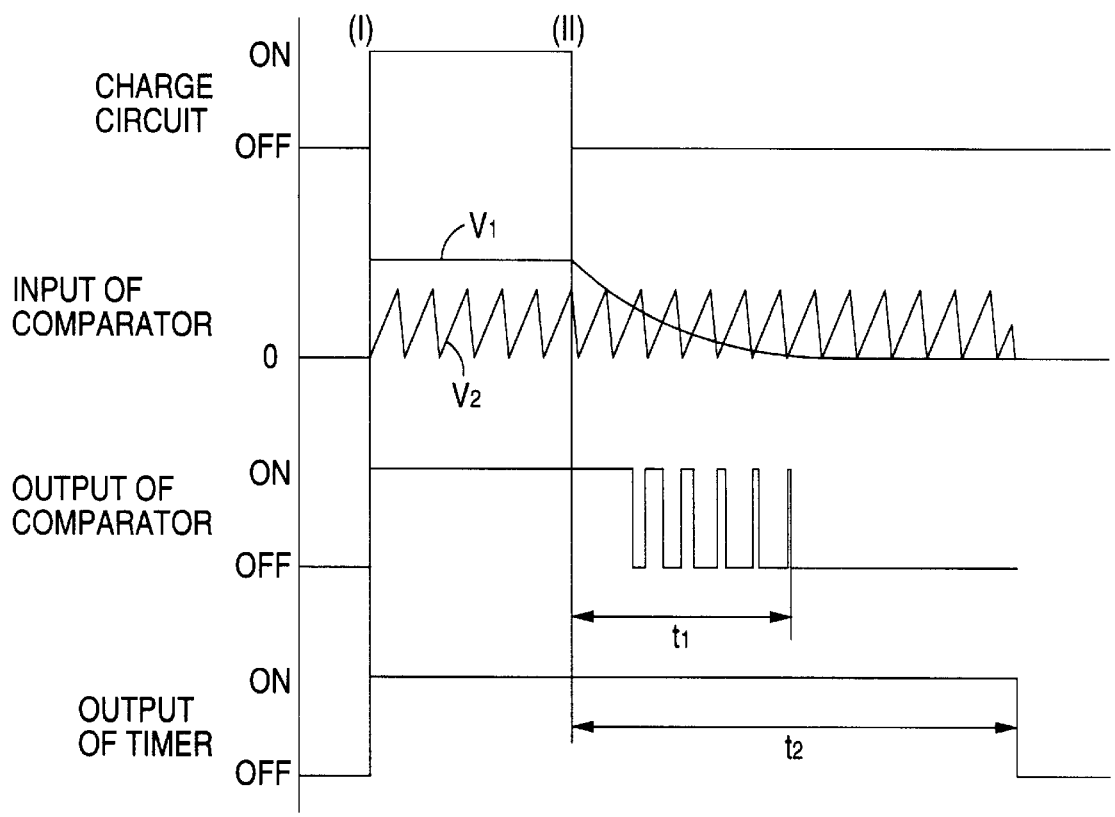
FIG. 19 is a timing chart for explaining the operation of the FIG. 18 device.
Figure 20:
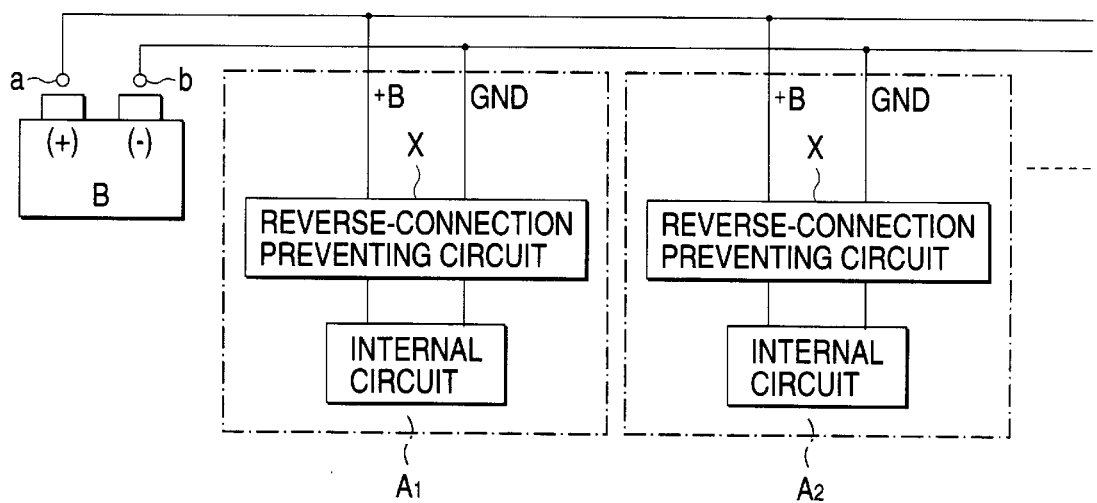
FIG. 20 is a circuit diagram showing a conventional battery connection.
Figure 21:
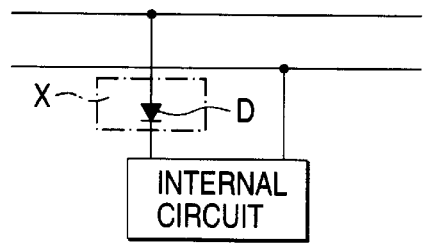
FIG. 21 is a circuit diagram showing a conventional reverse-connection rejecting circuit X.
Figure 22:
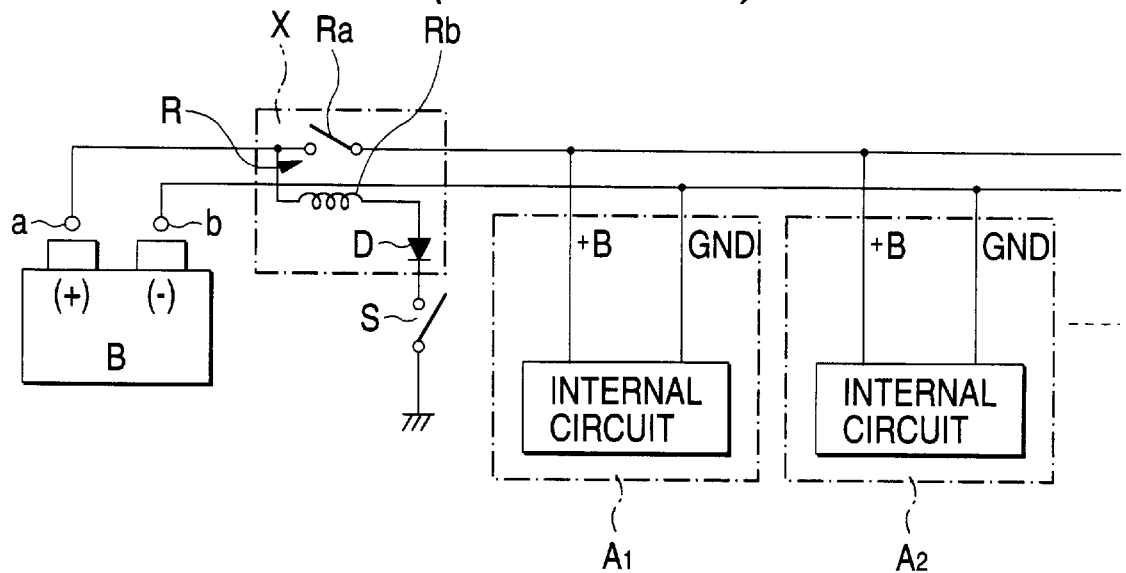
FIG. 22 is a circuit diagram showing another conventional battery connection.
Figure 23:
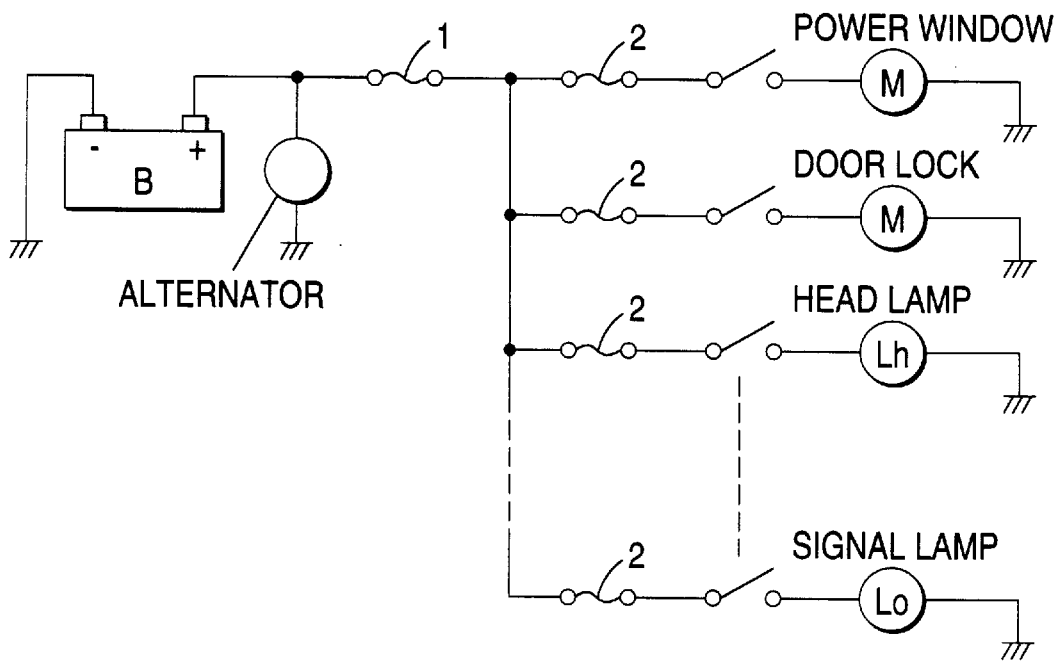
FIG. 23 is a block diagram showing a conventional power supply device.

As shown in FIG. 13, a room lamp device 501' for a motor vehicle according to the present invention generally includes a lamp switch circuit 520 and a controller circuit 521. These components are contained in a case having a battery connection terminal BT and a door switch connection terminal DT, as of the conventional room lamp device 501 shown in FIG. 17. Those are connected to a battery B and a door switch circuit 504.

In the present embodiment, the lamp switch circuit 520 is designed such that it can select any of three modes as of the conventional one. Accordingly, it has a trio of contacts, a first contact 505a interlocked in operation with the door switch circuit 504, a second contact 505b providing always an off state, and a third contact 505c providing always an on state. As shown in FIG. 13, in the present embodiment, two circuits are concurrently switched. Accordingly, the lamp switch circuit 520 is of a two-circuit three-throw type, and consists of two switch circuits, a first switch circuit 520a and a second switch circuit 520b.

In the present embodiment, the controller circuit 521 includes a timer circuit 522 and a relay circuit 523. The timer circuit 522 is formed with a long-time timer digital IC having an oscillator 522a and a frequency demultiplying counter 522b, bother being interconnected. The IC has a power input Vcc, time-constant circuit mounting inputs Rt and Ct, an enable terminal bar EN (referred to as EN), and a ground terminal GND.

The power input Vcc is connected through the first switch circuit 520a to the battery connection terminal BT. In the first switch circuit 520a, the first and third contacts 505a and 505c, which are connected in parallel to each other, are connected to the power input Vcc. The second contact 505b is open. With such a connection, if the first contact 505a or the third contact 505c is closed in the lamp switch circuit 520, the power input Vcc is connected to the battery connection terminal BT, there allowing the supply of electric power from the battery. When the second contact 505b is closed, the power input Vcc is disconnected from the battery connection terminal BT. The supply of electric power is interrupted. In the circuit, D1 designates a level shift diode, and R1 and C1 are a breeder resistor and a by-pass capacitor.

An oscillating frequency of the oscillator 522a may be determined by connecting a time constant circuit consisting of a resistor and a capacitor to the two time-constant circuit mounting inputs Rt and Ct.

Figure 14:
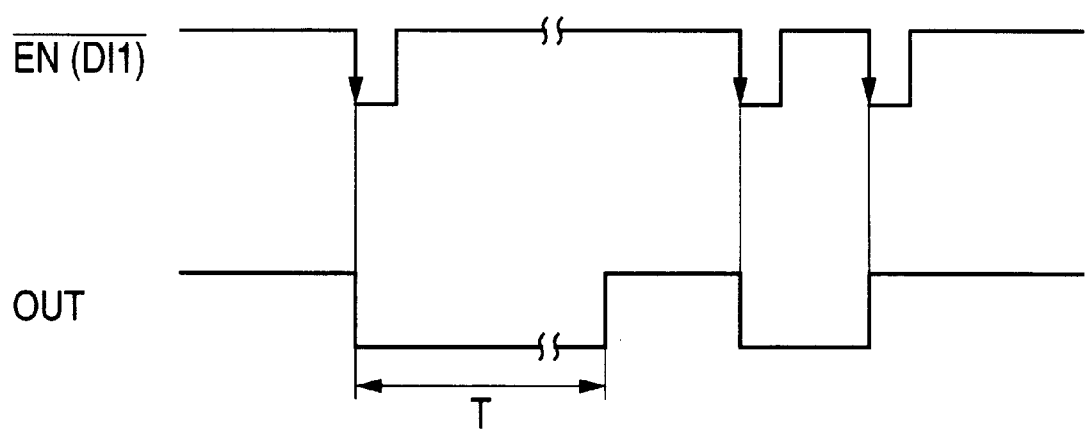
FIG. 14 shows a set of waveforms for explaining the operation of the room lamp device of FIG. 13.
Figure 16:
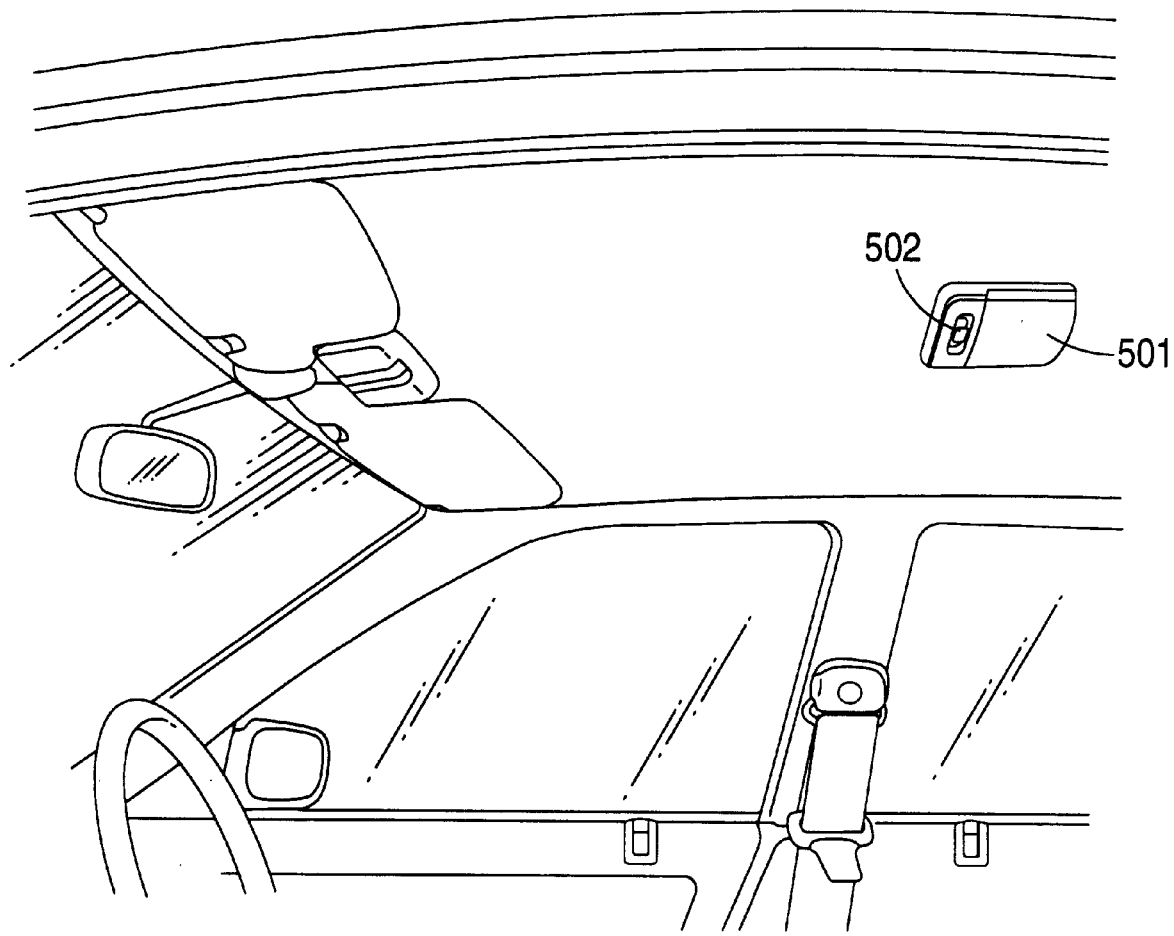
FIG. 16 is a perspective view showing a room lamp device attached to the motor vehicle.

The enable terminal EN is a negative edge trigger input, pulled up by an internal resistor. The enable terminal EN receives a signal input to the frequency demultiplying counter 522b. When a signal at the enable terminal EN is made active, the output signal of the frequency demultiplying counter 522b is inverted at the negative edge of the signal at the enable terminal EN, as shown in FIG. 14. In this state, the frequency demultiplying counter 522b accepts a pulse signal from the oscillator 522a. When the counter 522b counts up (T), its output signal is inverted. The output of the counter is an open collector output, which is connected to the relay circuit 523 as shown in FIG. 13. The relay circuit 523 and the room lamp 503 are connected in series between the battery connection terminal BT and the door switch connection terminal DT. The room lamp 503 is lit on and off through the operation of the relay circuit 523.

The enable terminal EN is connected through a diode D2 to a pull-up resistor R2. The pull-up resistor R2 is connected to the battery connection terminal BT.

The pull-up resistor R2 is connected to the second switch circuit 520b and the door switch circuit 504 (by way of the door switch connection terminal DT). In the second switch circuit 520b, the first and second contacts 505a and 505b are open. The third contact 505c is earthed. The door switch circuit 504 is earthed.

When the lamp switch circuit 520 is set at the first contact 505a, the second switch circuit 520b is open, and the door switch circuit 504 is valid. At this time, in the first switch circuit 520a the first contact 505a is closed, so that electric power is supplied to the timer circuit 522. Accordingly, the timer circuit 522 may be operated by turning on and off of the door switch circuit 504.

When the lamp switch circuit 520 is set at the second contact 505b, the second switch circuit 520b is open and connected to the door switch circuit 504. At this time, in the first switch circuit 520a, the second contact 505b is closed. The second contact 505b is open. Therefore, no electric power is supplied to the timer circuit 522. The timer circuit 522 does not operate.

When the lamp switch circuit 520 is set at the third contact 505c, the second switch circuit 520b is earthed. At this time, in the first switch circuit 520a, the third contact 505c is closed, to allow power source to be supplied to the timer circuit 522. Hence, the first switch circuit 520a is valid and the timer circuit 522 operates.

The room lamp device 501' thus arranged is firmly attached to a proper place inside the car, while the battery connection terminal BT and the door switch connection terminal DT are respectively connected to the battery B and the door switch circuit 504. Thus, the room lamp device may be mounted with the same connection as of the conventional one. Accordingly, the room lamp device 501' of the invention may be used in place of the conventional room lamp device 501.

To set the room lamp device 501' in a light-on mode, the lamp switch circuit 520 is set at the third contact 505c. Then, the first switch circuit 520a connects the battery B to the timer circuit 522, to thereby allow the power source supply. At the same time, the second switch circuit 520b is earthed. Then, the signal at the enable terminal EN is put in a L level. Therefore, the timer circuit 522 is active, the output signal of the frequency demultiplying counter 522b is inverted and the counter accepts an pulse signal from the oscillator and starts to count it. The timer circuit 522 is operated for a preset time, to light on the room lamp 503. Thereafter, the frequency demultiplying counter 522b comes to time-up. Its output signal is inverted as shown in FIG. 15A, the timer circuit 522 is put in an off state and the room lamp 503 is lit off.

Thus, the room lamp 503 may automatically be lit off after a preset time elapses. Therefore, if a driver inadvertently fails to turn off the switch, the battery B will never be excessively discharged.

The room lamp device 501 is interlocked in operation with the opening/closing of the door. Then, if the lamp switch circuit 520 is set at the first contact 505a, the first switch circuit 520a connects the battery B to the timer circuit 522, to thereby allow the supply of power source. At the same time, the second switch circuit 520b is open, and the door switch circuit 504 is valid. Therefore, when the door is opened, as shown in FIG. 15B, the door switch circuit 504 makes the signal at the enable terminal EN go low (L). Then, the timer circuit 522 is active, and the frequency demultiplying counter 522b inverts its output signal, accepts a pulse signal from the oscillator 522a, and starts to count. Then, the relay circuit 523 is operated to light on the room lamp 503 for a preset time. Thereafter, the counter comes to time-up, and inverts its output signal. The relay circuit 523 is deenergized to light off the room lamp 503, as shown in FIG. 15B.

Thus, even if the door is left open or incompletely closed, the room lamp is automatically lit off after a preset time elapses. The battery is not excessively discharged.

If the door is closed before the room lamp 503 is lit off, the door switch circuit 504 is turned off. Then, the enable terminal EN is earthed in the timer circuit 522. Therefore, the room lamp 503 remains lit up till the frequency demultiplying counter 522b counts up. Then, the relay circuit 523 is deenergized and the lamp 503 is light off.

To set the room lamp device 501' in a light-on mode, the lamp switch circuit 520 is set at the second contact 505b. Then, the first switch circuit 520a disconnects the battery B from the timer circuit 522. Accordingly, the timer circuit 522 does not operate, and the relay circuit 523 is deenergized, and the room lamp 503 is not lit on even if the door is opened.

Thus, even if a driver inadvertently fails to turn off the lamp switch circuit 520 or leaves the door incompletely closed, the room lamp may automatically be lit off within the preset time. Therefore, the room lamp device of the invention is free from the excessive discharging of the battery B.

As described above, the room lamp device of the invention contains the controller circuit 521, and may be connected between the door switch circuit 504 and the battery B, using two terminals as of the conventional. It is easy to replace the conventional room lamp device with the room lamp device of the invention. Then, the room lamp device of the invention is suitable for a variety but small number production because of easy optional use of the lamp devices.

The time-up time of the counter is properly selected, by experience, to be a time long enough to indicate the fact that the driver inadvertently fails to turn off the lamp switch or close the door.

As seen from the foregoing, when the room lamp is left lit up for a preset time or when the door switch is set at such a position as to leave the room lamp lit up, the room lamp device for a motor vehicle detects such a state and lights off the room lamp. Therefore, even if a driver inadvertently fails to turn off the lamp switch circuit or leaves the door incompletely closed, the room lamp may automatically be lit off. Accordingly, the battery is not excessively discharged.

The room lamp device of the invention contains the controller circuit, and may be connected between the door switch circuit and the battery B as of the conventional one. Accordingly, it is easy to replace the conventional room lamp device with the room lamp device of the invention. Then, the room lamp device of the invention is suitable for a variety but small number production because of easy optional use of the lamp devices.

What is claimed is:

1. A battery-to-load circuit for a motor vehicle that supplies power from a battery to load, the battery-to-load circuit comprising:
    a power supplying line connected between the battery and the load, said power supplying line having a power wire, a detecting layer made of metal, and an insulating layer being inserted between said power wire and said detecting layer, said detecting layer being maintained at a fixed voltage by means of external resistors; and
    detecting means connected to said detecting layer of said power supplying line for detecting whether a short-circuit occurs in the battery-to-load circuit on the basis of a voltage variation of the detecting layer.

2. The battery-to-load circuit according to claim 1, wherein said detecting layer is maintained at a fixed voltage by resistor means connected to the ends of said detecting layer that are closer to a power supply side and a load side.

3. The battery-to-load circuit according to claim 1, wherein a shielding layer is provided between said power wire and said detecting layer.

4. A battery-to-load circuit for a motor vehicle that supplies power from a battery to a load, the battery-to-load circuit comprising:
    a circuit breaker connecting the battery and the load, said load comprising auxiliary devices, and
    a resistor connected in parallel across said circuit breaker, said resistor also connecting the battery and the load.

5. The battery-to-load circuit according to claim 4, wherein states of switches associated with said auxiliary devices are detected by monitoring a voltage at a point downstream of said circuit breaker in relation to the battery, and said circuit breaker is turned on and off on the basis of a detected state of each said switch.

6. The battery-to-load circuit according to claim 4, wherein a voltage at a point downstream of said circuit breaker in relation to said battery is monitored while periodically turning off said circuit breaker within such a time period as not to influence the operation of each said auxiliary device.

7. A battery-to-load circuit for a motor vehicle that supplies power from a battery to a load, in which the battery-to-load circuit:
    constantly monitors operating states of load units connected to the battery;
    calculates currents to be consumed by said load units on the basis of the operating states monitored;
    detects a supplied current from the battery to said load units;
    compares the calculated consumption current of said load units with the current supplied from the battery to said load units; and
    interrupts the supply of electric power from the battery to the associated load unit when the supplied current is either excessively larger or smaller than the calculated consumption current.

8. The battery-to-load circuit according to claim 7, wherein the comparison of the calculated consumption current of each said load unit with the current supplied from the battery to each said load unit is performed after a preset time elapses from detection of an operating state of each said load unit.

9. The battery-to-load circuit according to claim 7, further comprising a memory for storing the consumption current values of said load units, wherein a sum of a preset margin and the detected supplied current from the battery to said load units is stored into said memory, and each of those sum current values is read out of said memory and compared with the current supplied from the battery.

10. The battery-to-load circuit according to claim 7, wherein said load units comprise at least one of a group including a wiper unit, a power window unit, a door lock unit, and a light unit.

11. The battery-to-load circuit according to claim 7, further comprising a power supply unit connected to said load units by a multi-signal line, said power supply unit calculating said consumption currents using operating state output from said load units through said multi-signal line.

12. The battery-to-load circuit according to claim 11, wherein the comparison of the calculated consumption current of each said load unit with the current supplied from the battery to each said load unit is performed after a preset time elapses from detection of an operating state of each said load unit.

13. The battery-to-load circuit according to claim 11, further comprising a memory for storing the consumption current values of said load units, wherein a sum of a preset margin and the detected supplied current from the battery to said load units is stored into said memory, and each of those sum current values is read out of said memory and compared with the current supplied from the battery.

14. A room lamp device for a motor vehicle wherein a room lamp may be placed in a mode selected from one of three modes, said room lamp device connecting a battery and a door switch, said door switch being either turned on or off with the opening and closing of a motor vehicle door, said three modes comprising a light-on mode in which the room lamp is always in an on state, a light-off mode in which the room lamp is always in an off state, and a temporary light-on mode in which the room lamp is either in the on state or the off state, said room lamp device comprising:

a lamp switch inserted between the door switch and the battery; which places said room lamp in a selected mode dependent upon said door switch being turned on or off; and a controller which turns off the room lamp when said lamp switch is set in the light-on mode for a preset time.

15. The room lamp device according to claim 14, wherein said controller turns off the room lamp when said door switch is set at a position where the room lamp is lit on for a preset time period.

* * * * *